Jan. 16, 1968 P. J. COHEN ET AL 3,364,439

FREQUENCY CORRECTED DIGITAL CLOCK WITH MEMORY IN PHASE CONTROL LOOP

Filed Oct. 7, 1966 17 Sheets-Sheet 1

*INVENTOR.*
PETER J. COHEN
PHILIP W. ACKERMAN

*BY* George B. Aujerolk

ATTORNEY

INVENTOR.
PETER J. COHEN
PHILIP W. ACKERMAN
BY George B. Oujevolk
ATTORNEY

Jan. 16, 1968 P. J. COHEN ET AL 3,364,439
FREQUENCY CORRECTED DIGITAL CLOCK WITH MEMORY IN PHASE CONTROL LOOP
Filed Oct. 7, 1966 17 Sheets-Sheet 3
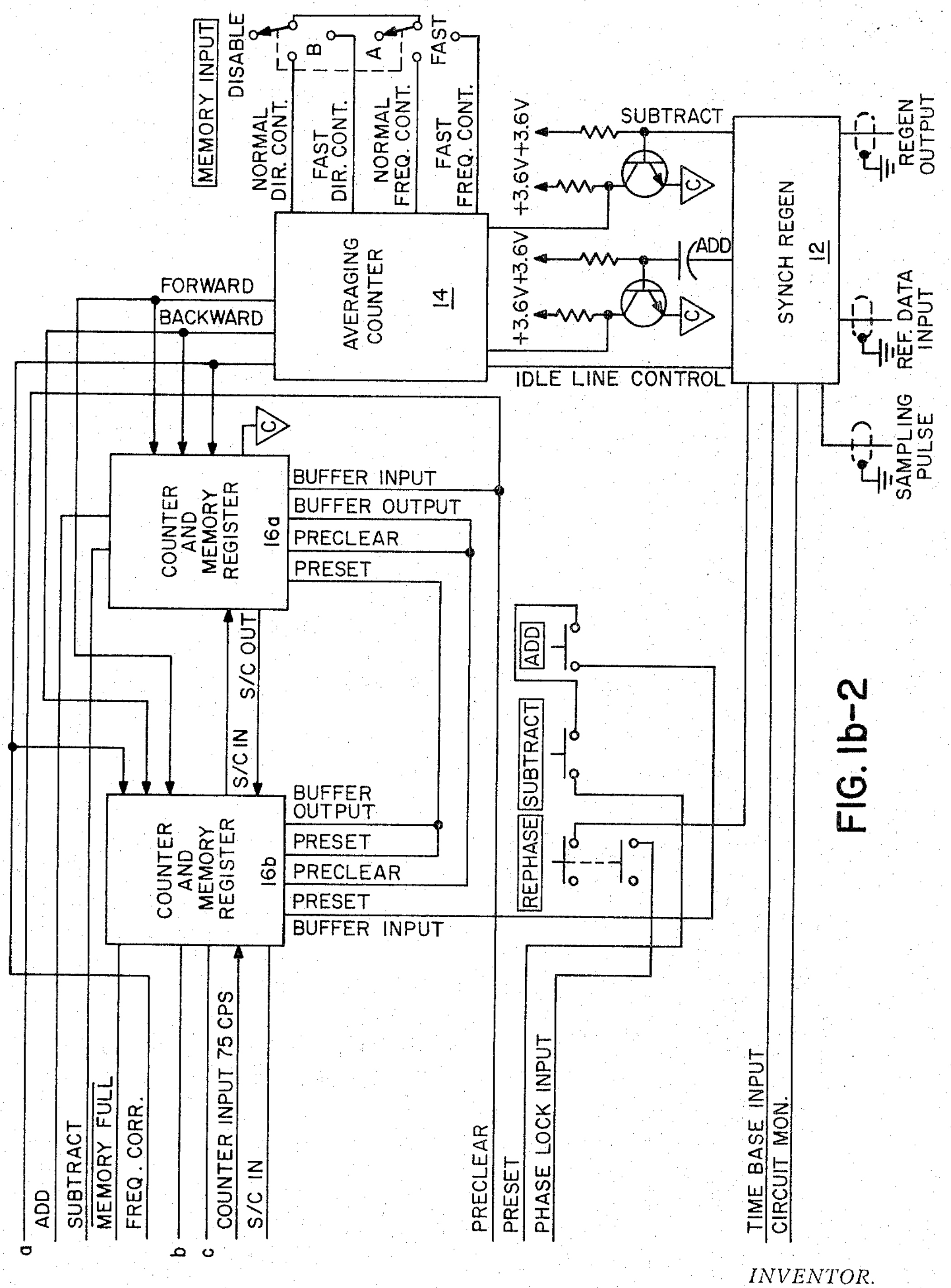
FIG. Ib-2
INVENTOR.
PETER J. COHEN
PHILIP W. ACKERMAN
BY George B. Oujevolk
ATTORNEY INVENTOR.
PETER J. COHEN
PHILIP W. ACKERMAN
BY
George B. Auyerolk
ATTORNEY INVENTOR.
PETER J. COHEN
PHILIP W. ACKERMAN
BY
George B. Oujevolk
ATTORNEY INVENTOR.
PETER J. COHEN
PHILIP W. ACKERMAN
BY
George B. Oujevolk
ATTORNEY INVENTOR.
PETER J. COHEN
PHILIP W. ACKERMAN
BY George B. Angerbek
ATTORNEY INVENTOR.
PETER J. COHEN
PHILIP W. ACKERMAN
BY
George B. Oujevolk
ATTORNEY INVENTOR.
PETER J. COHEN
PHILIP W. ACKERMAN
BY
George B. Oujevolk
ATTORNEY INVENTOR.
PETER J. COHEN
PHILIP W. ACKERMAN
BY
George B. Oujevolk
ATTORNEY INVENTOR.
PETER J. COHEN
PHILIP W. ACKERMAN
BY
George B. Oujevolk
ATTORNEY INVENTOR.
PETER J. COHEN
PHILIP W. ACKERMAN
BY George B. Oujevolk
ATTORNEY Jan. 16, 1968 P. J. COHEN ET AL 3,364,439

FREQUENCY CORRECTED DIGITAL CLOCK WITH MEMORY IN PHASE CONTROL LOOP

Filed Oct. 7, 1966 17 Sheets-Sheet 13

INVENTOR.
PETER J. COHEN
PHILIP W. ACKERMAN

BY George B. Oujevolk
ATTORNEY

INVENTOR.
PETER J. COHEN
PHILIP W. ACKERMAN
BY George B. Oujevolk
ATTORNEY

INVENTOR.
PETER J. COHEN
PHILIP W. ACKERMAN
BY
George B. Oujevolk
ATTORNEY

INVENTOR.
PETER J. COHEN
PHILIP W. ACKERMAN
BY George B. Auyevalk
ATTORNEY

INVENTOR.
PETER J. COHEN
PHILIP W. ACKERMAN
BY
George B. Oujevolk
ATTORNEY

United States Patent Office 3,364,439
Patented Jan. 16, 1968

3,364,439

FREQUENCY CORRECTED DIGITAL CLOCK WITH MEMORY IN PHASE CONTROL LOOP

Peter J. Cohen, Stony Brook, and Philip W. Ackerman, Smithtown, N.Y., assignors to Tele-Signal Corporation, Hicksville, N.Y.

Filed Oct. 7, 1966, Ser. No. 585,021
9 Claims. (Cl. 331—17)

Figure 1A:
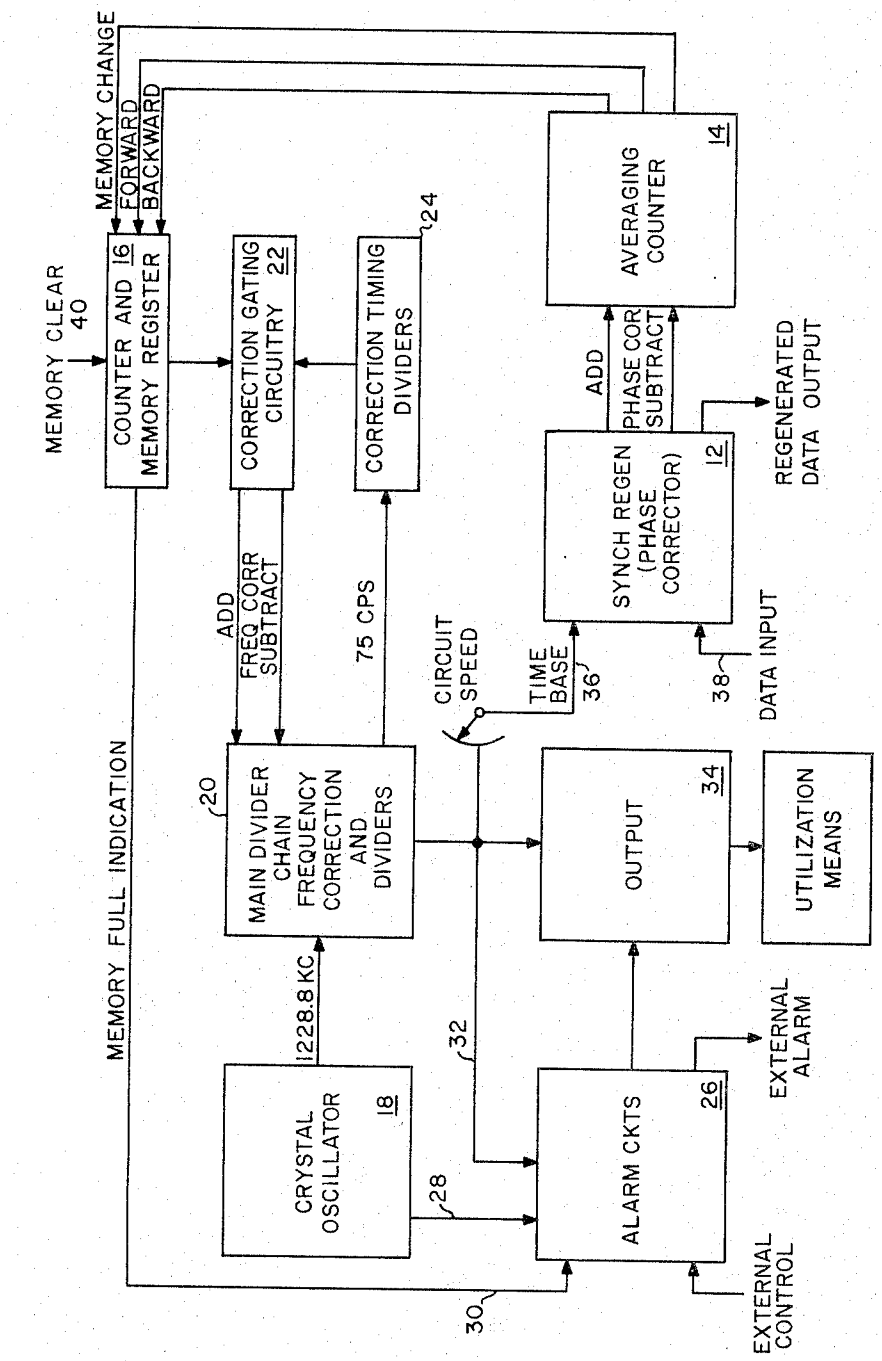

The present invention relates to the measurement of time and more particularly to a digital, frequency corrected clock.

Most modern communication systems demand highly accurate timing signals for data transmission and the handling of computer programs. Large stations are generally equipped with "atomic clocks" of the cesium beam or rubidium vapor variety. Smaller sites have need for a timing reference of comparable accuracy but at a greatly reduced cost. This need has been met in the past by crystal oscillators. Even high quality crystal oscillators drift with age, however, and must be periodically recalibrated. This requires highly trained personnel with expensive and time-consuming test equipment, which are in short supply at the small station.

An alternate approach is to somehow monitor data which has been timed by a distant atomic clock, and use this information to correct a local crystal oscillator. The major difficulties encountered are that the data is not always present and, when available, may be at a low speed with varying distortion and jitter.

One may rightfully ask what harm a slightly different frequency due to drift can cause, if one used a normal crystal oscillator alone. Consider a frequency difference between the local oscillator and the distant atomic clock of one part per million. To maintain synchronism, most data handling equipment cannot tolerate more than one half bit drift during periods when data is not present. At a data rate of 2400 bits per second it can be calculated that synchronism will be lost in slightly over three minutes. This situation is unacceptable.

One approach is to build a clock which will derive meaningful information from data which has been transmitted by an atomic clock. This signal has been dispatched with an accuracy of perhaps two parts in $10^{11}$, and what is needed is a clock which will:

(a) Synchronize itself to the incoming data;

(b) Derive frequency and phase information to continually update its internal oscillator;

(c) Provide a timing reference which will be sufficiently stable to maintain synchronism between local and distant equipment when data is interrupted.

If it is possible to synchronize the clock to the distant data, the drift rate would then become a function of the minimum resolution and the short term stability of the local oscillator. Long term drift, due to crystal aging, can be completely compensated for, and recalibration would never be required.

To accomplish this objective, a digital clock has been built. The clock utilizes a digital servo which phase locks to a data channel and derives frequency correction information. The correction information, in binary form, is stored in a memory register. Addition or subtraction pulses are subsequently gated into a local oscillator's divider chain as dictated by the memory. A gating arrangement insures that correction pulses are evenly distributed, reducing output phase jitter to less than one microsecond. The digital frequency correction provides an unlimited ratio of maximum to minimum correction increment, not possible with voltage controlled oscillators.

The digital memory has several advantages. First, it is capable of continuously updating the clock during times when data is absent for twenty-four hours or more. Secondly, the frequency resolution is limited only by the acceptable response time for initial synchronization. The ultimate limitation becomes therefore, the short term stability of the local oscillator.

The clock herein described has a possible design criteria of tracking to within three parts in $10^8$ of a distant source. Using quartz oscillators now available it is possible to build a unit with a stability of five parts per billion for an indefinite number of years.

Figures 1, 1B:
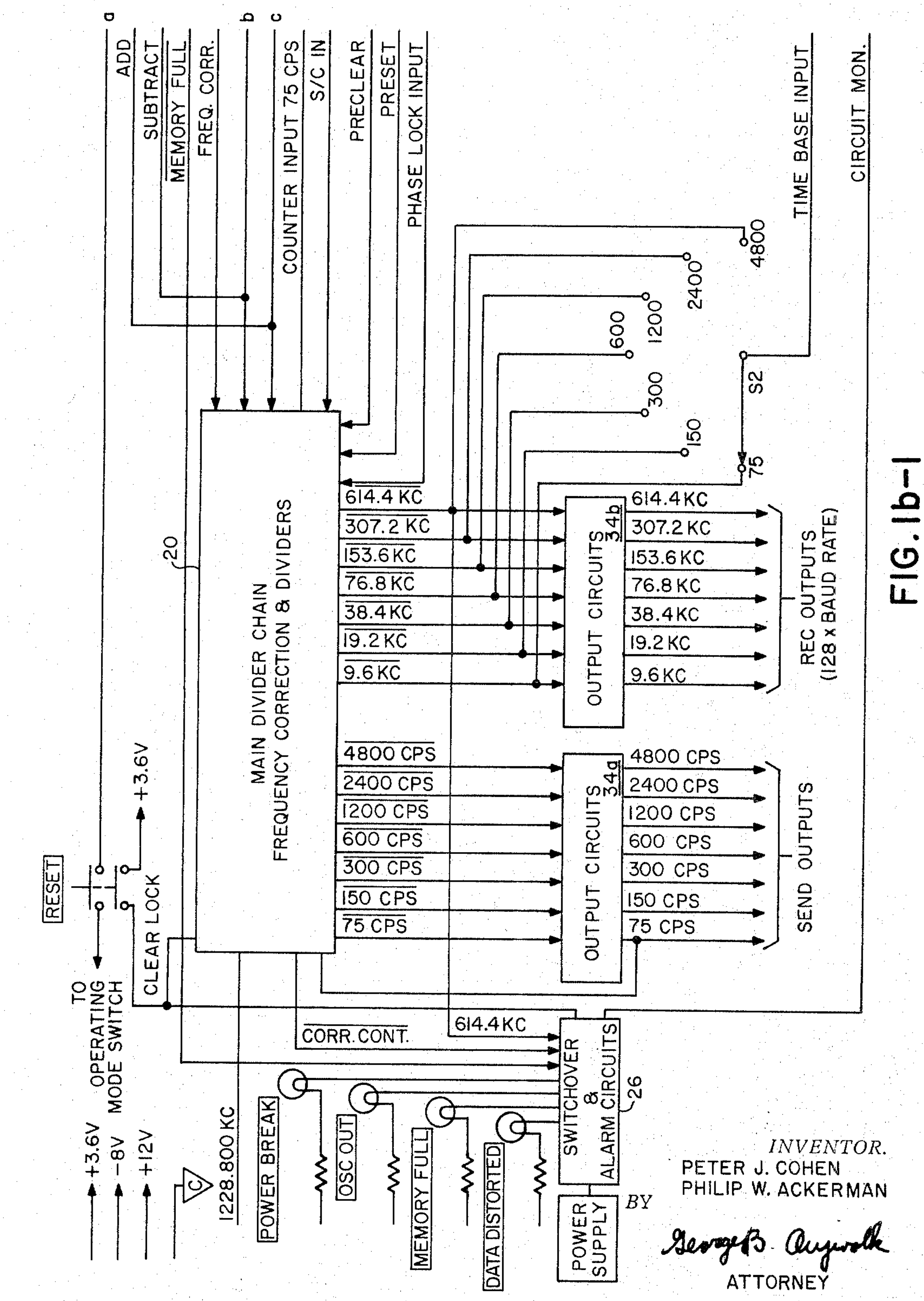
Figure 2A:
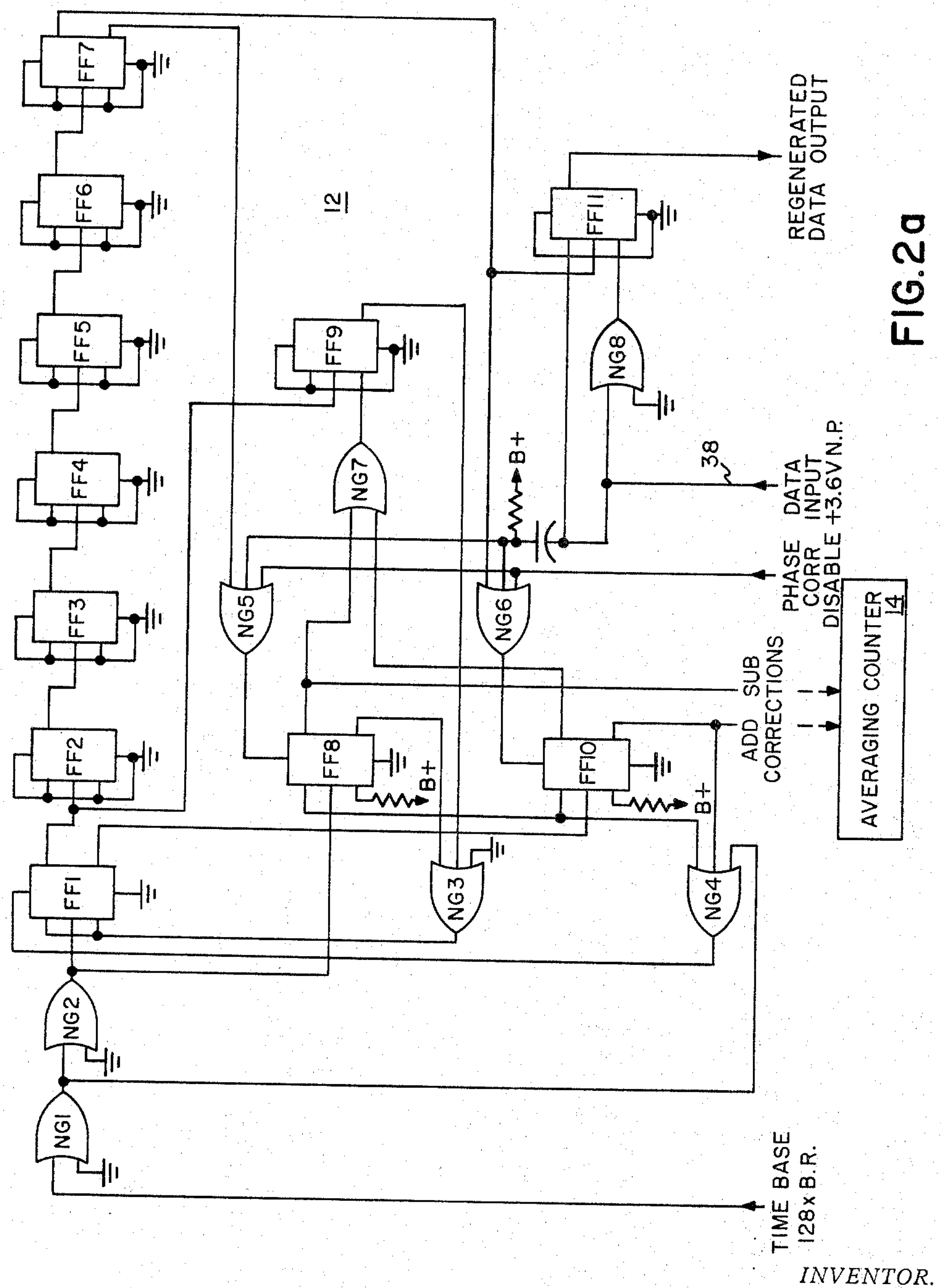
Figures 1, 2B:
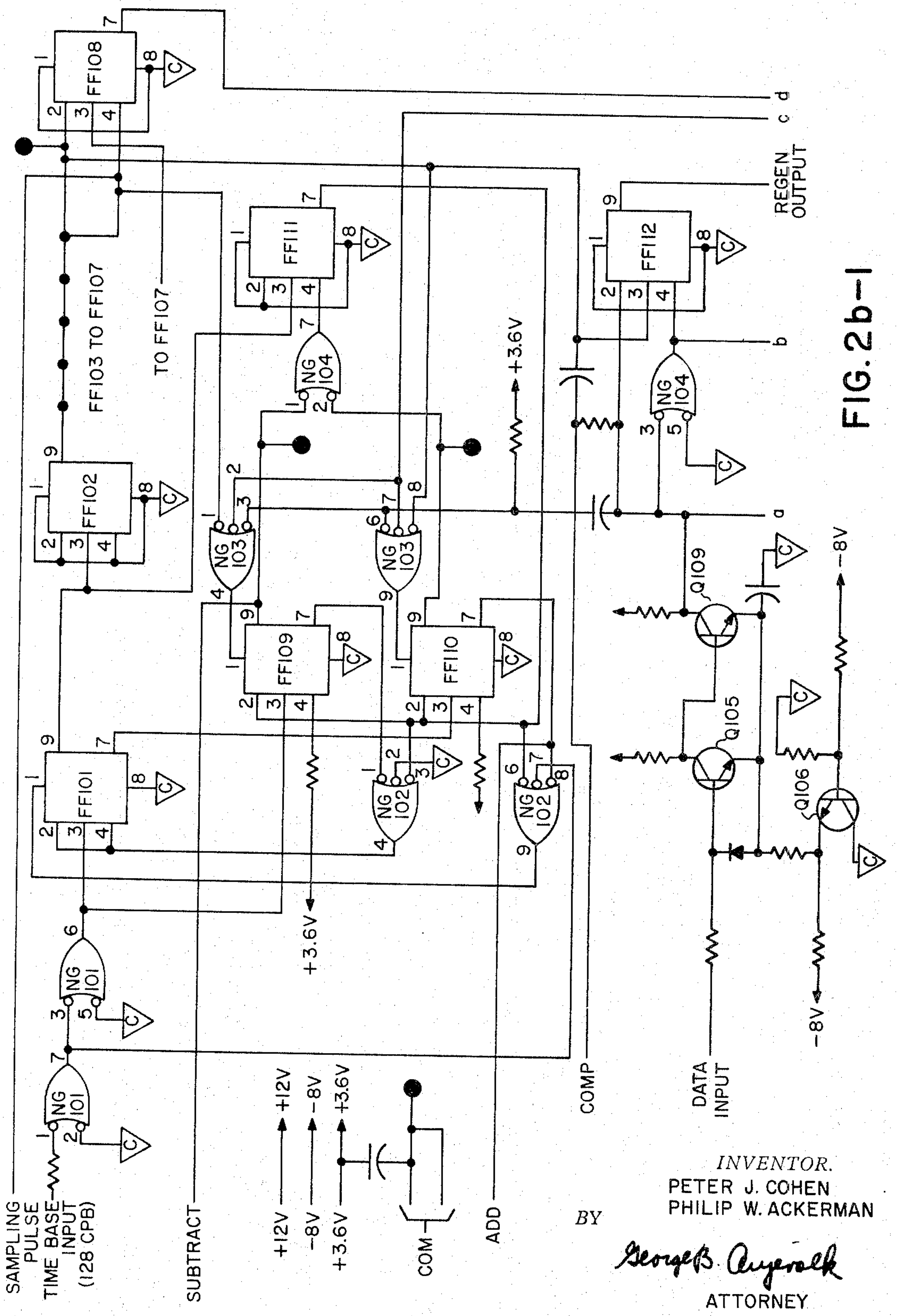
Figures 2, 2B:
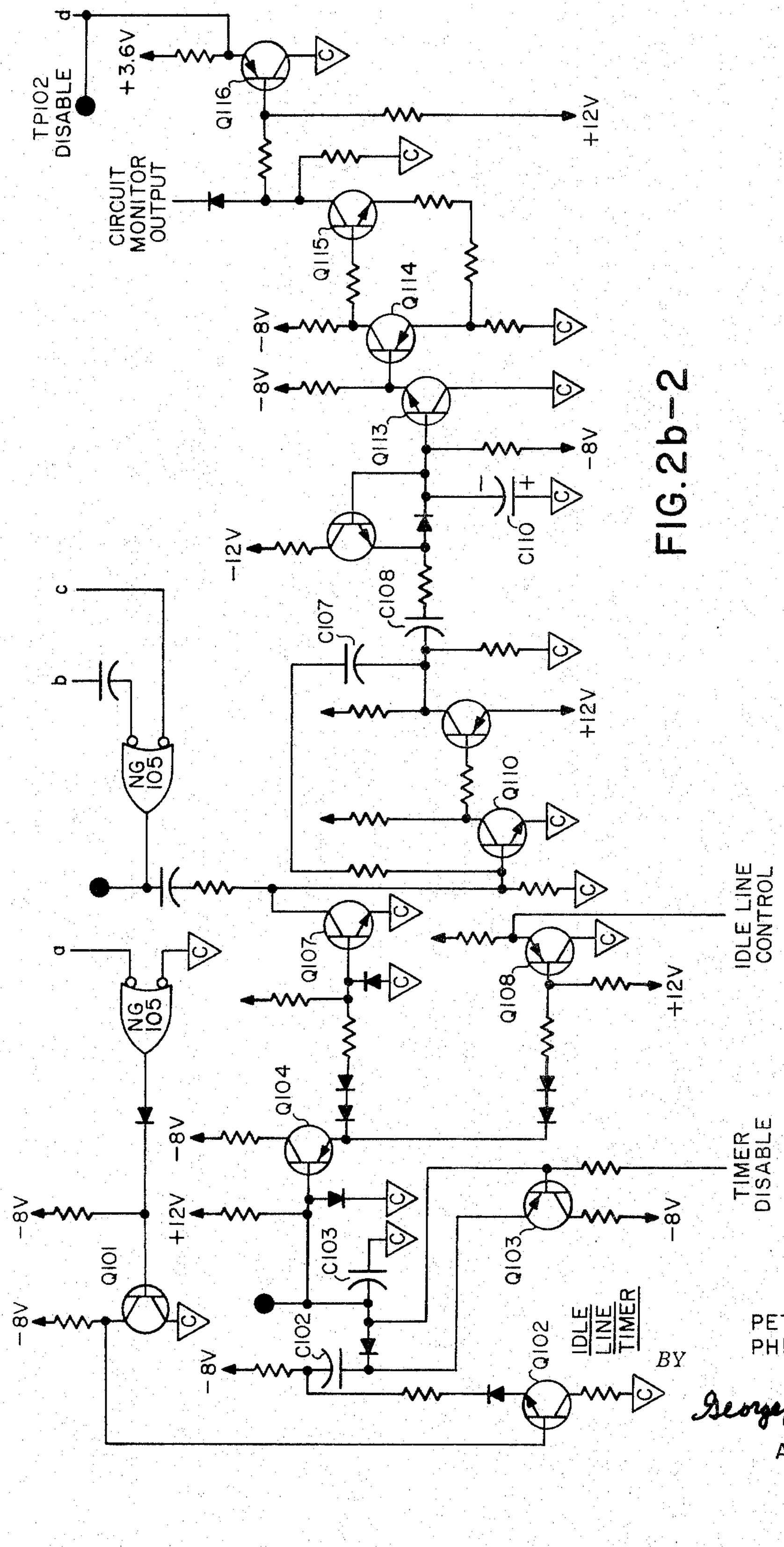
Figure 3A:
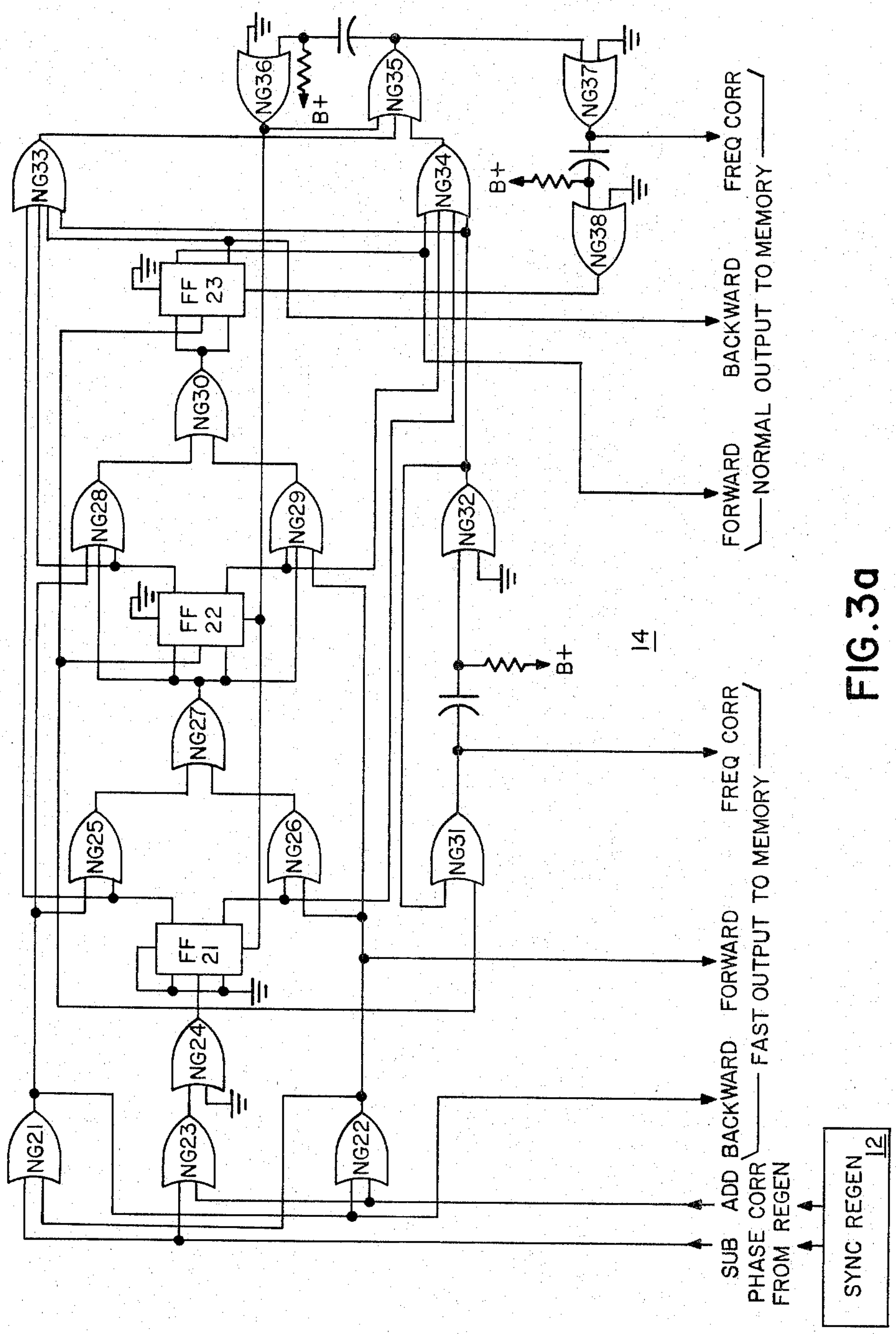
Figures 1, 3B:
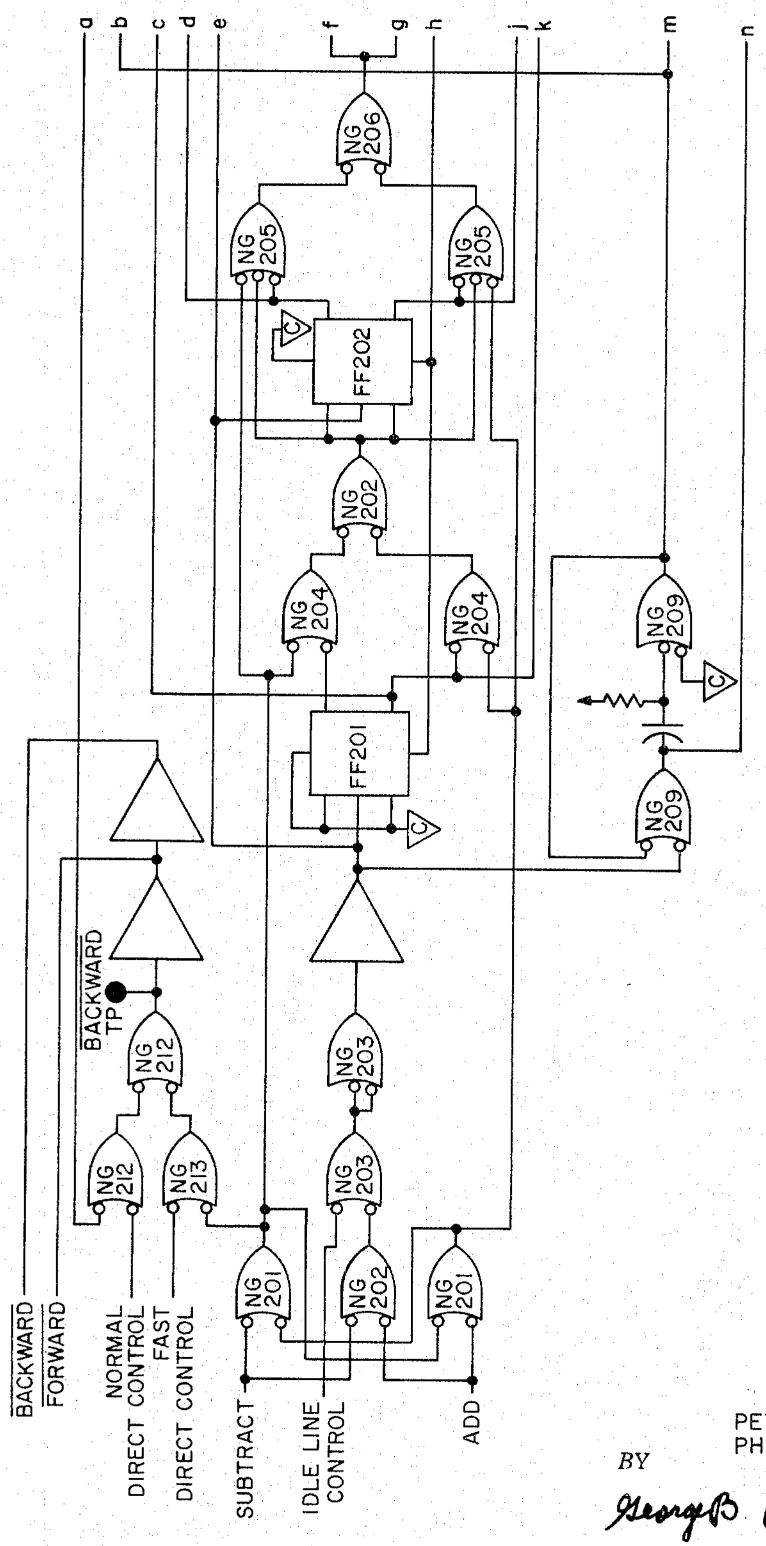
Figures 2, 3B:
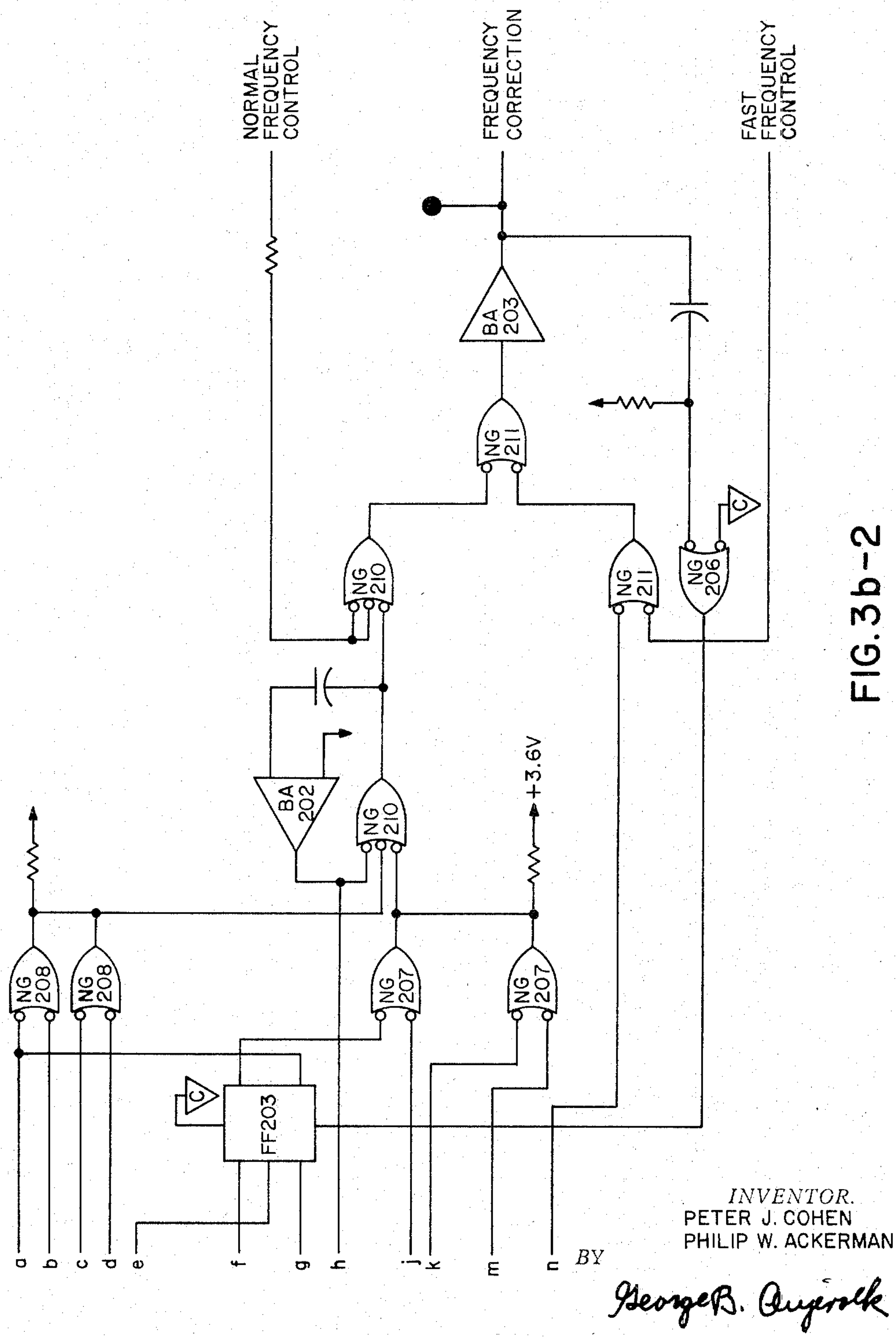
Figure 4A:
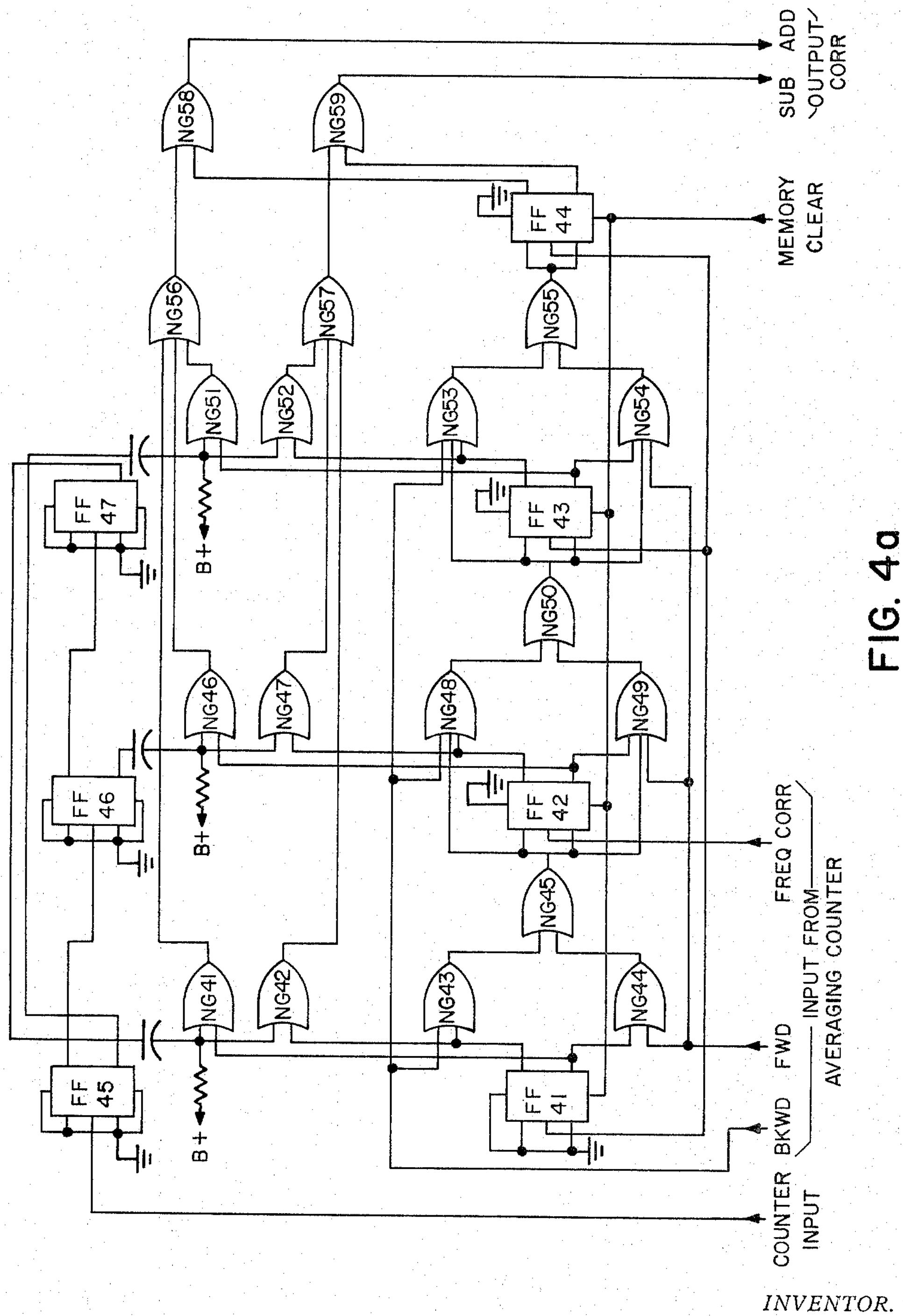
Figures 1, 4B:
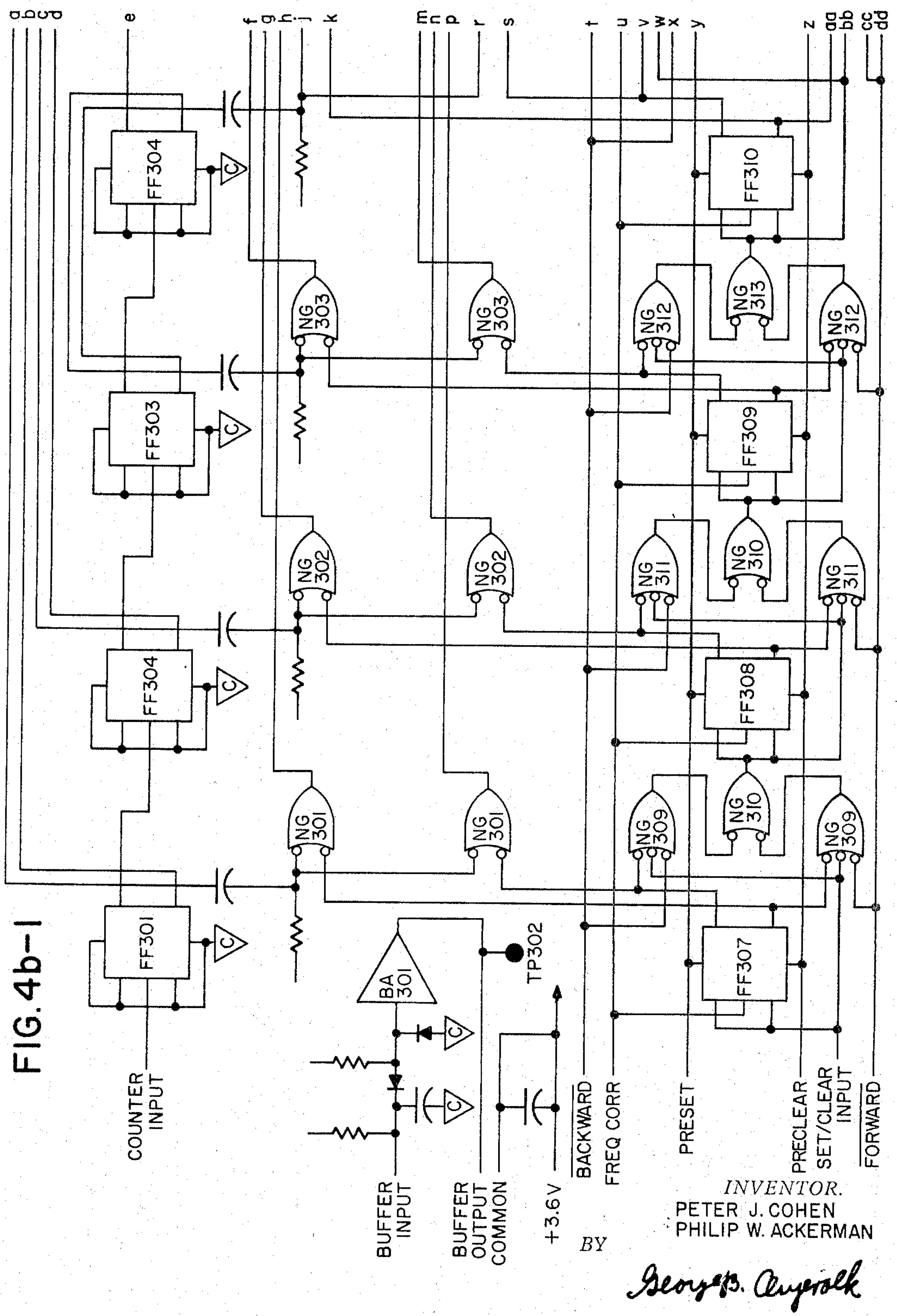
Figures 2, 4B:
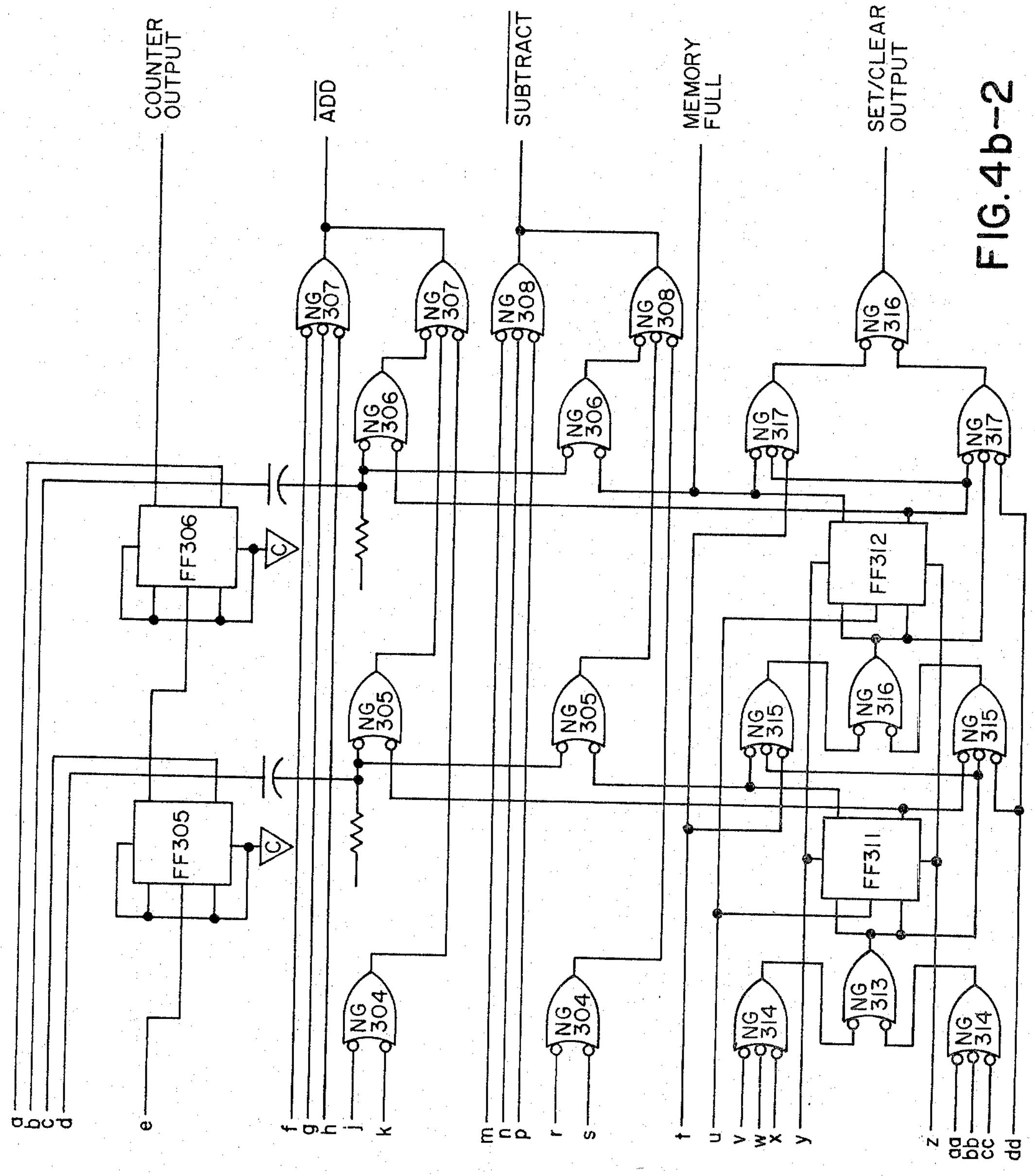
Figure 5A:
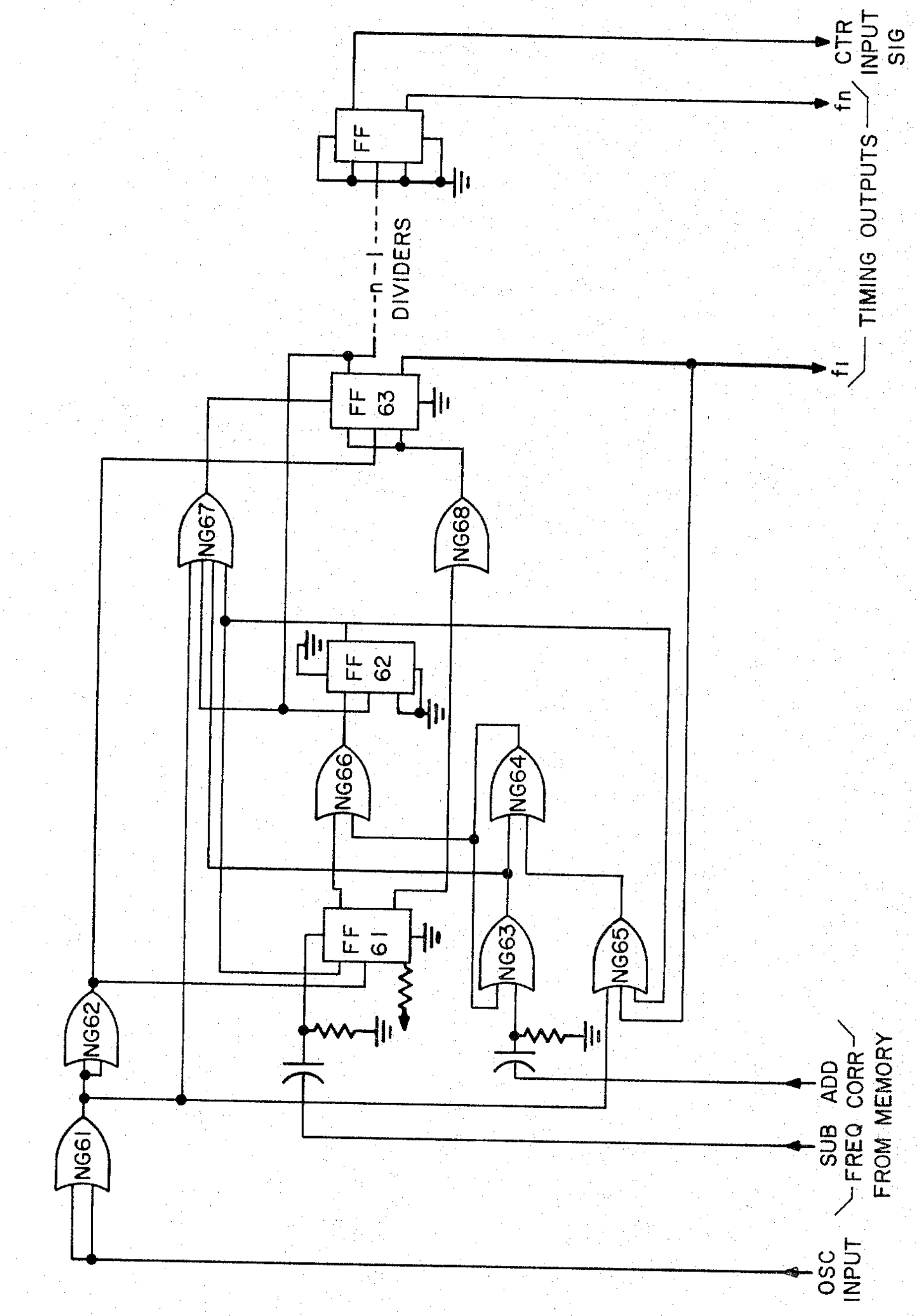
Figure 5B:
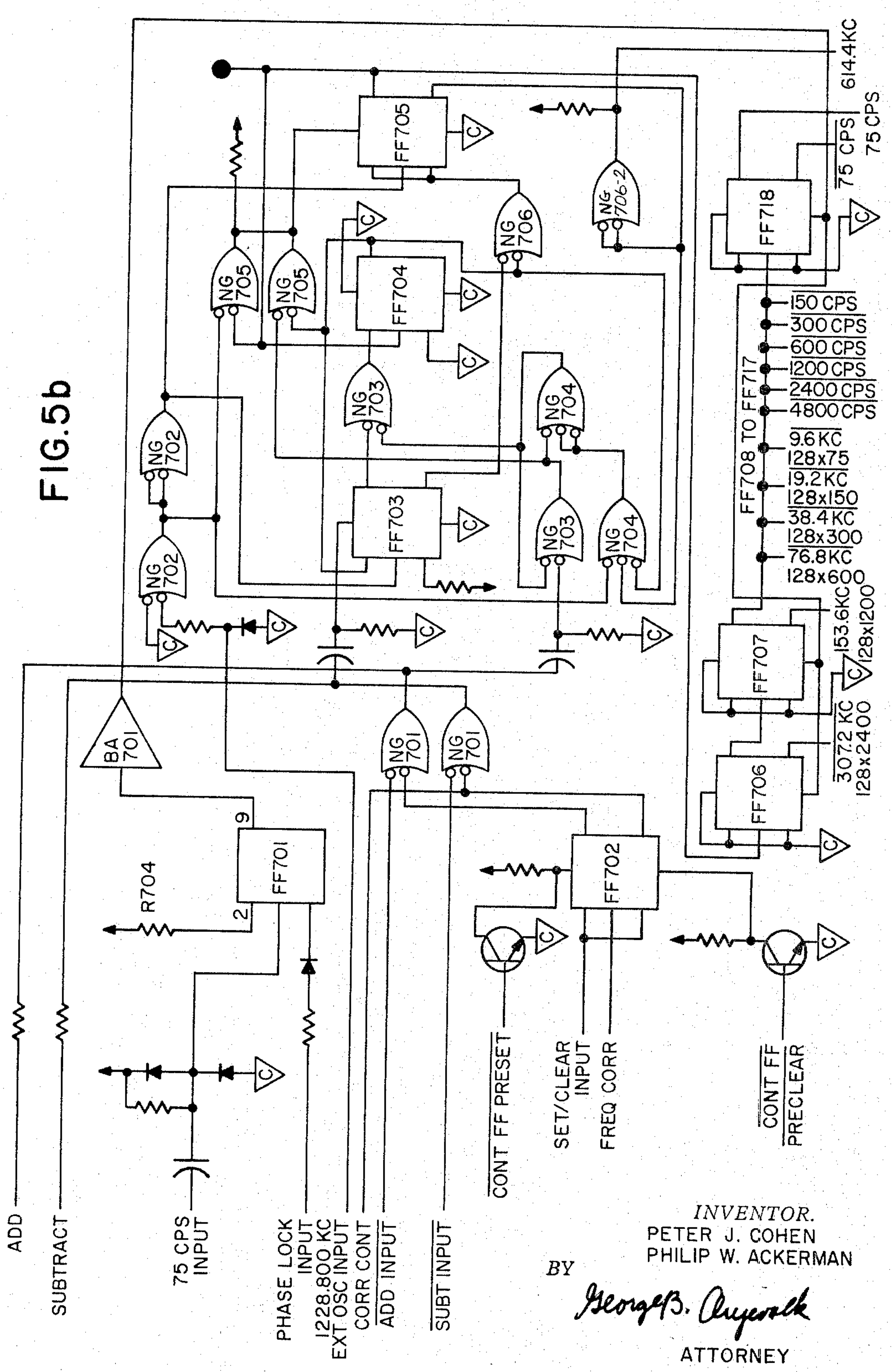
Figure 6:
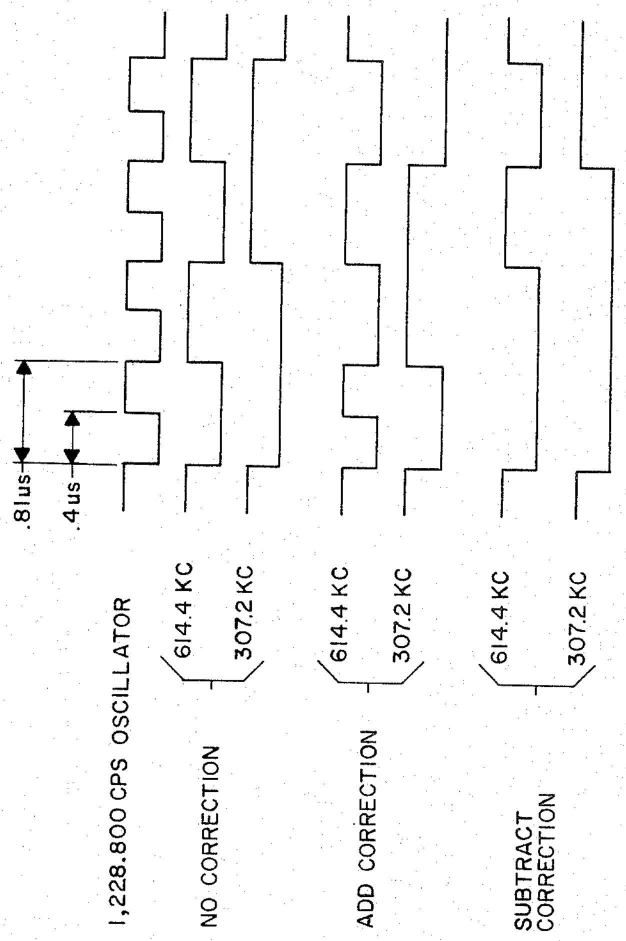
Figure 6B:
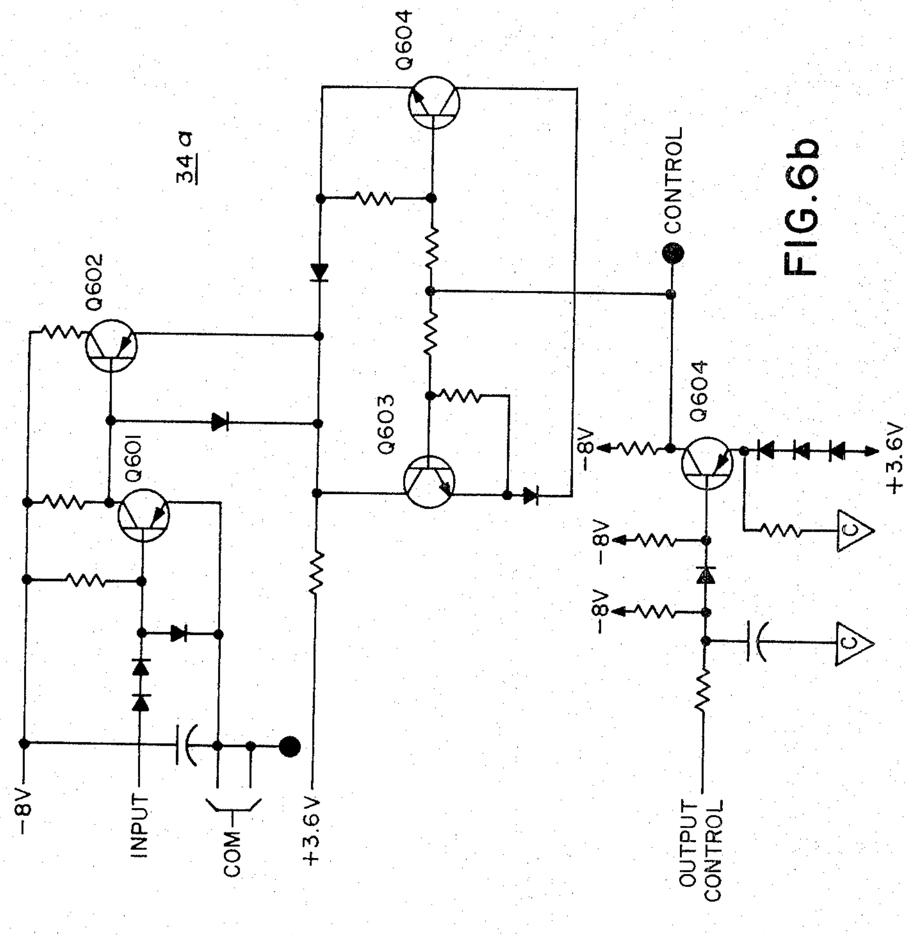
Figure 7:
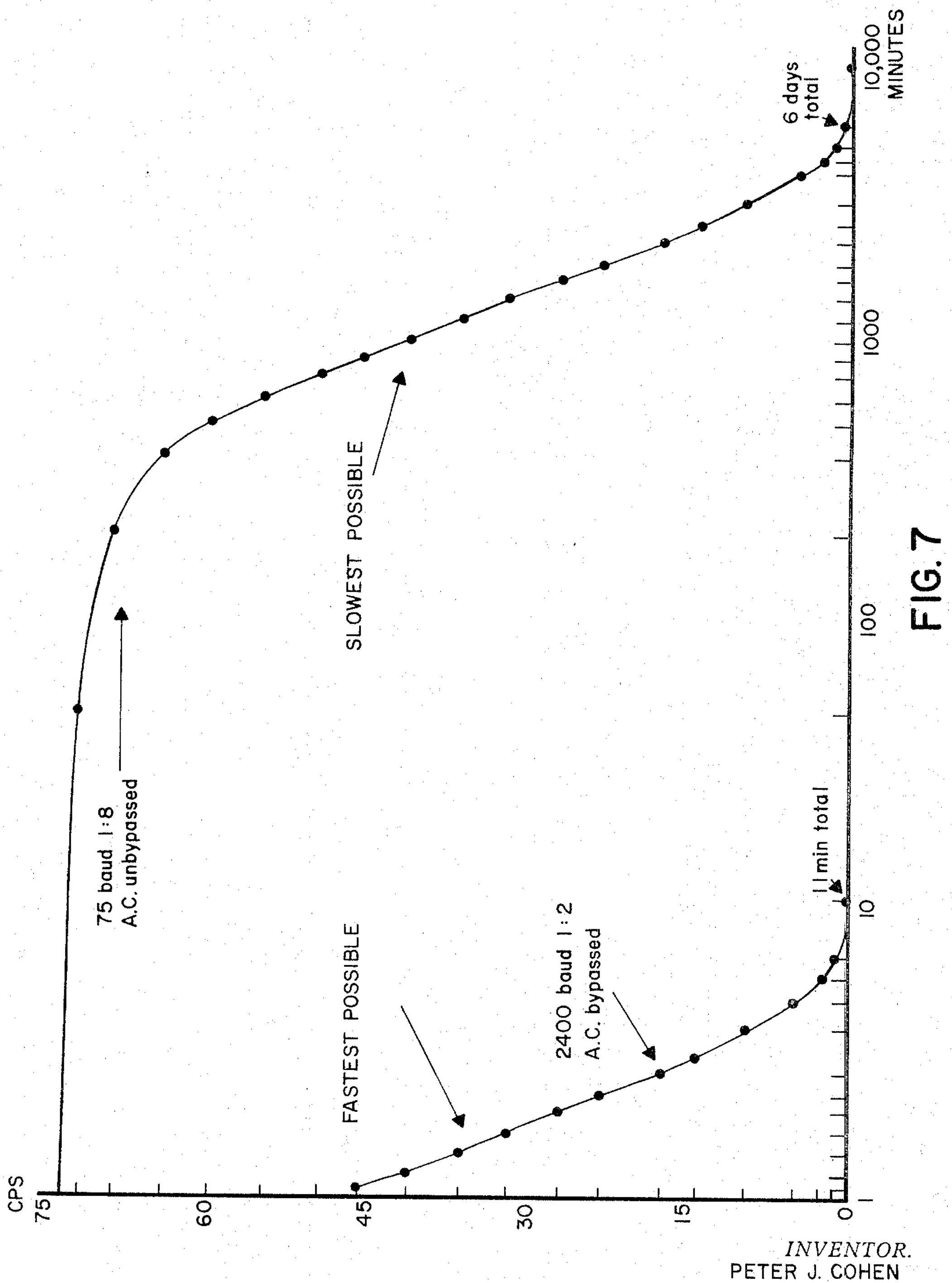

The invention as well as other objects and advantages thereof will be apparent from the following detailed description when taken together with the accompanying drawing, in which:

FIG. 1*a* shows a block diagram of the clock system contemplated herein;

FIGS. 1*b*–1 and 1*b*–2 correspond generally to FIGURE 1*a* but refer to an actual embodiment reduced to practice, showing the components in block diagram;

FIG. 2*a* represents a simple schematic block diagram of one of the blocks shown in FIGURE 1*a*;

FIGS. 2*b*–1 and 2*b*–2 likewise correspond to FIGURE 2*a* illustrating in schematic form the components used in practice;

FIG. 3*a* represents a simple schematic block diagram of another block shown in FIGURE 1*a*;

FIGS. 3*b*–1 and 3*b*–2 in the same way depict the system of FIGURE 3*a* as carried out into practice;

FIG. 4*a* again represents a simple schematic block diagram of still another block component shown in FIGURE 1*a*;

FIGS. 4*b*–1 and 4*b*–2 also show in schematic form an actual embodiment of FIGURE 4*a*;

FIG. 5*a* then illustrates in simple schematic and block diagram form yet another component appearing in FIGURE 1*a* as a block;

FIG. 5*b* in the like manner corresponds to FIGURE 5*a* and shows schematically and in block diagram the components required in practice for the function of this block;

FIG. 6 is a two-dimensional representation of wave forms used in connection with some of the concepts presented herein;

FIG. 6*b* is a schematic circuit diagram of one of the output drivers circuits; and, FIG. 7 shows graphically some of the mathematic computations used herein.

*General description*

Referring to the system block diagram, FIGURE 1*a*, the transmitted reference data is monitored by synchronous regenerator 12, which phase-locks to the data. Pulses, corresponding to the relative phase difference between the data and an internally generated sampling pulse, are generated. These ADD and SUBTRACT pulses are fed to an averaging counter 14. If the internal time base is slower than the incoming data, for example, more ADD and SUBTRACT pulses will be generated. The end result will be the addition of pulses to the main divider chain 20, speeding up the time base to the point where equal numbers of ADD and SUBTRACT pulses leave the regenerator, causing a net change of zero.

Due to jitter of the data signal, or some other background noise, there are times when the regenerator 12 must generate one or more ADD or SUBTRACT pulses which do not really reflect the correct frequency of the data. Since the memory register 16 comprises a forward/backward counter, these minor differences are compensated for in the long run, but excessive jitter in the output will occur. This is not desirable, hence an averaging counter 14 is used to integrate out minor deviations and to deliver only legitimate corrections to the memory register 16, i.e., the averaging counter 14 delivers an output pulse to the memory register only when three or more corrections in the same direction are made by the synchronous regenerator. The output to the memory register 16 is a series of pulses with an associated command for each pulse, to tell the memory which direction to move. Initially there might be five pulses per second delivered to the memory register, when synchronism has been obtained this will drop to one pulse per minute or less.

In the averaging counter, the counter and memory portions of the circuitry consist of a forward/backward counter, serving as the memory, cross-gated with a straight divider which runs continuously. The cross-gating, as will be apparent later, insures that pulses are gated out in proportion to the frequency error; furthermore these pulses are evenly distributed regardless of the magnitude of the input signal.

An internal crystal oscillator 18 drives a main divider chain 20 which provides both the reference timing outputs and the input for the free-running dividers in the memory. The first divider after the oscillator has provisions for inserting or blocking pulses to the main divider chain. A correction gating circuitry 22 is fed from the output of the counter and memory register, and gated to the main divider chain 20. Correction gating circuitry 22 is, in turn, corrected by correction timing dividers 24 fed by the main divider chain 20. In this manner pulses are added or deleted to the output 34 and back to the time base 36 of the synchronous regenerator. This, then completes the loop. The output might be used to drive other circuitry, e.g., a computer.

*Calculations*

Within the framework of the overall circuitry described, a series of calculations must first be made, preferably in a particular sequence as outlined:

(a) The allowable drift rate, during loss of data, will be determined. This will tell what the sum of the minimum counter resolution and the short term stability of the oscillator must be;

(b) The internal oscillator frequency will be determined from the allowable jitter and the maximum output frequency required.

(c) The maximum correction rate desired will determine the input frequency to the free-running counter in the memory. Knowing this frequency and knowing the total allowable drift rate, will make possible the calculation of the number of stages required in the memory. This figure will in turn yield the actual minimum resolution attained.

(d) Subtracting the minimum resolution from the total allowable drift rate will yield the required short term stability of the oscillator.

(e) It is then possible to calculate the pull-in time for any data speed and for any frequency difference. This calculation discloses that for low data rates it will be advantageous to bypass the averaging counter during initial acquisition.

For example, a requirement may be that, at the highest data rate of 2400 bits per second, loss of data for a period of one hour will result in relative drift of less than half a bit.

Let $d$=total drift (bits)
$b$=data rate (bits/sec.)
$r$=drift rate (bits/bit)
$t$=minimum period of ½ bit drift (hours)

Since max allowable drift is ½-bit, $d=.5$ $$\text{drift rate } r=\frac{d(\text{bits})}{b\left(\frac{\text{bits}}{\text{sec.}}\right).3600\left(\frac{\text{sec.}}{\text{hour}}\right).t\ (\text{hour})}$$

therefore, $$r=\frac{d}{b(3600)t}$$

If $b$=2400 bits/sec.
$t$=1 hour $$r=\frac{.5}{2400\ (3600)\ (1)}=\underline{\underline{5.8\times10^{-8}}}$$

At the moment when data is interrupted, synchronization may be off by as much as the minimum resolution of the clock. The drift rate must hence include both the short term drift of the oscillator and the minimum resolution of the clock.

With regard to the oscillator frequency, the first requirement is to provide a time base output (at 128 cycles/bit for most types of external equipment) for 4800 baud operation and below (baud refers to bit rate of data transmission). It is therefore necessary to have at least $4800\times128=614{,}400$ c.p.s. available. Furthermore, this frequency must have been corrected from the memory; this implies one flip-flop ahead of the 614.4 kc. or 1228.800 kc. The second criteria is to minimize jitter in the output signal, hopefully to less than one microsecond. The wave forms shown in FIGURE 6 may be considered in this connection. As can be seen from FIGURE 6, the output jitter, due to either an ADD or SUBTRACT correction is 0.81 microsecond. This is acceptable and the oscillator frequency is hence fixed at 1,228,900 c.p.s.

If the requirement is to be able to correct at a maximum rate of at least 60 p.p.m., this corresponds to $$60\ (1.2288)=73.7\ \text{c.p.s.}$$

on the oscillator frequency. If the input to the free-running counter in the memory is 75 c.p.s., there will be a maximum correction rate of $75/1.228\times10^{6}=61$ parts per million, which is acceptable.

If the allowable drift rate is $5.8\times10^{-8}$, this must include minimum resolution plus short term oscillator stability.

With a minimum resolution of $2\times10^{-8}$, how long does it take for $10^{8}/2$ bits to pass?

$$x=\frac{10^{8}}{2\times1.2288\times10^{6}}=\frac{100}{2.458}=40.7\ \text{seconds per cycle}$$

If $n$=number of dividers required
$2^{n}=40.7$ sec./cycle$\times75$ cycle=3050
$2^{11}=2048 \quad 2^{12}=4096$ Therefore, $n=12$ dividers required. Using 12 dividers $X^{1}=4096/75=54.6$ seconds per cycle.

$$\text{minimum resolution}=\frac{1}{54.5(1.2288)\times10^{6}}=1.5\times10^{-8}$$

The allowable short term stability of the oscillator must hence $5.8-1.5=4.3\times10^{-8}$. An oscillator with a stability of $1\times10^{-8}$ is then required. This allows for the possibility of the averaging counter making an occasional mistake, in which case, an additional $1.5\times10^{-8}$ error could be introduced.

*Synchronous regenerator (FIG. 2a)*

The synchronous regenerator 12 has the primary function of phase-locking to the incoming data, and deriving information from it. This is accomplished by phase correcting a sampling pulse (generated from the clock's internal oscillator) to the incoming data. The ADD and SUBTRACT pulses generated by the synchronous regenerator are evaluated by the clock and are used to update the memory. As a by-product, the synchronous regenerator retimes and reshapes the data signal used as a reference, removing up to 48 percent bias or distortion.

The synchronous regenerator 12 center-samples each incoming data bit and retains this signal in the output flip-flop until the next sampling pulse occurs.

The sampling pulse is obtained by dividing an external time base signal by 128 (when properly phase locked). To initially shift the sampling pulse to the proper phase, the time base signal is divided by 127 or 129 instead of 128. If the sampling pulse is occurring too late (after the center of the bit), a "correction pulse" is added to the divider. This causes the next sampling pulse to occur after 127 cycles of the time base instead of 128. This is repeated until the sampling pulse is shifted to the proper phase position. If the sampling pulse is occurring too soon (before the center of the bit), a subtraction flip-flop is set. This blocks one cycle of the time base from triggering the divider, and then the subtraction flip-flop resets. This causes the next sampling pulse to occur after 129 cycles of the time base instead of 128 cycles. This is repeated until the sampling pulse is shifted to the center of the bit.

In the circuit description, the notation "FF1" implies flip-flop number 1. All flip-flops employed are the "J-K" type with "preset" and "preclear" capability. The other basic logic element used is the gate. "NG1" implies nor-gate number 1. Its logic dictates that all grounds ("0" level) are required on the inputs to produce a high ("1" level) at the output. Conversely, any input going high causes the output to go low. The gates are inverting and are often used solely for this purpose.

The time base signal (128×bit rate) enters via inverters NG1 and NG2, and then is divided by 128 in FF1 through FF7 to provide the sampling pulse. The relative phase between the normal or inverted sampling pulses and the data pulses enables either NG5 or NG6, to provide either subtraction or addition, respectively. To subtract a pulse, FF8 and NG3 provide a pulse at the J-K (trigger inhibit) points of FF1, blocking one cycle of the incoming time base. For addition, a pulse (roughly 1. microsecond) will appear at the preset pins of FF1 and will insert a pulse in its output. FF9 controls the relative timing of the addition and subtraction pulses, insuring that they are inserted and removed at the proper times to prevent conflict with the normal pulses from oscillator. The outputs of FF8 and FF10 provide the ADD and SUBTRACT pulses which feed averaging counter 14. These are differentiated and changed to one microsecond pulses enroute to the averaging counter.

Data and inverted data pass to the J-K (trigger inhibit) points on the output flip-flop, FF11. The corrected sampling pulse center-samples each bit, and the output signal is derived free of bias or distortion.

*Averaging counter (FIG. 3a)*

The averaging counter 14 evaluates the ADD and SUBTRACT pulses generated by the synchronous regenerator, and subsequently updates the memory. In the fast mode, all pulses are passed directly to the memory, while in the normal mode three pulses in the same direction are required to gate one pulse to the memory.

As shown in FIGURE 3*a*, the ADD and SUBTRACT pulses enter NG21 and NG22, which comprise a DC flip-flop. The outputs of these gates set the levels for the counter to move either forward or backward as required. In the fast mode, these forward/backward lines pass directly to the memory, and the composite train of pulses is derived from pulse-stretcher NG31 and NG32.

In the normal mode, the train of pulses hits flip-flops FF21, FF22, and FF23. If the clock happens to be at exactly the same frequency as the distant data clock, equal numbers of ADD and SUBTRACT pulses enter alternately. These pulses are nominally one microsecond wide and two volts in magnitude. Due to the forward/backward capability of the counter, the net count is zero as long as an equal number of ADD and SUBTRACT pulses arrive. If one or the other predominates, the counter advances and a pulse is gated out. The state of FF23 dictates whether the pulse gated out is to advance or retard the memory.

Nor gates NG31 and NG32 provide the output pulse in fast, and also provide an inhibit to prevent false readout of the counter while in normal. Nor-gates NG33 and NG34 detect the proper counts for gating out a pulse, and enable NG35 to couple a pulse through. Inverter NG36 stretches the pulse to about three microseconds and resets FF21 and FF22. The trailing edge of the output pulse gates a reset pulse for FF3 through gates NG37 and 38. This later reset of FF23 is required because FF23 provides the levels which dictate whether the memory is to move forward or backward with each incoming pulse. Each pulse lasts about three microseconds and it is the trailing edge which triggers the flip-flops in the memory. This gives sufficient set up time for the memory before the transition occurs.

*Counter and memory (FIG. 4a)*

The circuit shown and described in FIGURE 4*a* is for three stages, and the number of stages used is limited only by accuracy desired and acquisition time which can be tolerated. The first three and the last stage is shown; in an actual unit built, there were twelve stages utilized.

This portion of the clock circuitry comprises three sections: a straight divider chain; a forward/backward counter, and gating to obtain read out pulses as required from the memory.

The frequency corrections evolving from the averaging counter are applied to flip-flops FF41 through FF44. The forward/backward levels determine whether the counter advances or retards, and the net count in the flip-flops reflects the total number of pulses to be applied to the divider chain.

The upper dividers FF45 through FF47 run continuously, dividing down from the 75 c.p.s. output of the frequency correction and divider of main divider chain 20. The output of each flip-flop is cross-gated with the output of a memory flip-flop. The state of the memory flip-flop then determines if a pulse is to be gated through or not. Duplicate gating for ADD and SUBTRACT lines allows either to pass pulses as directed by the control flip-flop, FF44. The ADD and SUBTRACT lines are complementary; their outputs always total 75 pulses per second. A gating arrangement, i.e., NG41 to 59 provides symmetric distribution of the correction pulses and lack of "bunching" minimizes jitter in the output.

The memory clear input 40 allows the memory to be initially set to zero by application of a positive pulse.

*Main divider chain (FIG. 5a)*

The remainder of the basic clock circuitry consists of two sections, correction gating circuitry 22 which applies the corrections from the memory to the divider chain 20, and the main divider chain 20 itself.

The oscillator frequency, in this case 1228.800 kc., provided by crystal oscillator 18 is inverted by gates NG61 and NG62, and is applied at the toggle point of flip-flop FF63. The output of FF63 is 614.400 kc.±corrections applied.

ADD pulses from the memory are differentiated and routed to gate NG63 which, together with NG64, comprises a DC flip-flop. These pulses subsequently route through NG67 to the preset point of FF63. Here narrow pulses are inserted in the output, thus increasing the output frequency.

SUBTRACT pulses similarly route to the preset point of FF61, which subsequently passes pulses through NG68 to the J–K points of FF63. This temporarily positive level blocks one incoming pulse to the flip-flop, hence reducing its output frequency. Flip-flop FF62 and NG66 controls the proper timing of the ADD and SUBTRACT operations.

Flip-flops FF63 through FF6$n$+3 comprise the main divider chain which performs two functions. First it provides the reference timing outputs which are buffered, converted, etc. and routed to the using equipment. Secondly the last divider (in this case the 14th) provides the 75 c.p.s. signal which drives the counter associated with the memory.

For the purpose of giving those skilled in the art a better understanding of the invention, the following illustrative example is given:

*Example*

It is desired to be able to estimate the time required for the clock to track the distant data source to within its limits of accuracy. The requirement that the system must be able to correct a maximum of 75 p.p.m. dictates that the system memory must be driven at the input by a 75 c.p.s. signal. The resolution required is ±3 parts per $10^8$, which dictates that the memory system should be twelve stages long. The input is hence 75 c.p.s. and the output is $75/2^{12}=1$ cycle every 54.6 seconds. The latter figure suggests that, although it is possible to correct relatively quickly for large tracking deviations, it may take a considerable amount of time for the final few corrections to be made.

The time required for pull-in is directly proportioned to the data rate; hence for slow data rates, especially with low data patterns, the pull-in time could prove excessively long. This suggests that the averaging counter may have to be initially bypassed to provide a reasonable pull-in time. The calculations will be initially shown, for simplicity sake, with the averaging counter bypassed. Unbypassed, all pull-in times are multiplied by a factor of three; this will be shown to be excessively long at low data speeds, hence the bypass is a necessity.

The beginning of the correction loop (if it can be considered to have a beginning) is the synchronous regenerator 12. For each data bit, it makes a decision with respect to an internally generated sampling pulse. Data which is exactly on frequency causes the synchronous regenerator to issue equal numbers of ADD and SUBTRACT pulses, one per data bit. The fastest data rate available is 4800 baud 1:2 reversals. This is a pattern of alternating "mark" and "space" for a total of 2400 corrections per second. "Perfect" data hence results in 1200 ADD and 1200 SUBTRACT pulses per second. If the data is slow with respect to the clock, a preponderance of SUBTRACT pulses will be delivered, slowing the clock down to match the data. The 2400 p.p.s. issued in this case would consist of $x+y=2400$, $x-y=$some number proportional to the error existing. Exact synchronization will result in equal numbers on the ADD and SUBTRACT lines, because the clock has been slowed down to match the data; the same analogy holds for data which is faster than the clock. The averaging counter removes the jitter, and equal numbers of ADD and SUBTRACT pulses from the synchronous regenerator result in a zero output to change the memory. Even in the bypassed mode it is possible to think of the memory as receiving only a net amount of "X" ADD or "Y" SUBTRACT corrections per second, since it, like the averaging counter, is a forward/backward counter. Its count is initially zero, and is updated in either the positive or negative direction as dictated by the synchronous regenerator.

The twelve flip-flops in the memory contribute differently weighted outputs to actually perform the frequency correction in the clock. To calculate pull-in time it is first necessary to know their relative weighing in c.p.s. correction as follows.

| FF: | |
|---|---|
| 1st | .02 |
| 2nd | .04 |
| 3rd | .07 |
| 4th | .1 |
| 5th | .3 |
| 6th | .6 |
| 7th | 1.17 |
| 8th | 2.34 |
| 9th | 4.68 |
| 10th | 9.36 |
| 11th | 18.72 |
| 12th | 37.5 |

A "1" stored in the first FF will hence cause the output frequency to change by .02 c.p.s., while a "1" in the twelfth FF causes a change of 37.5 c.p.s. If all flip-flops are in the "1" state, the memory is full, and a maximum correction of 75 c.p.s. is applied to the 1,228,800 c.p.s. oscillator frequency.

It is necessary to know, given any data rate and pattern, and given any difference in frequency between the clock and the data, what net correction the synchronous regenerator will deliver to the memory.

Let $E$=net difference in ADD and SUBTRACT pulses per second entering the memory
$b$=data bit correction rate in bits per second
$fp$=present clock frequency in c.p.s. (nominal 1.2 mc.)
$\Delta f$=difference between present clock frequency and final clock frequency in c.p.s.

$$E\left(\frac{\text{Correction pulses}}{\text{sec.}}\right)=\left(b\,\frac{\text{bits}}{\text{sec.}}\right)\cdot 128\left(\frac{\text{Correction pulses}}{\text{bit}}\right)\cdot f\left(\frac{\text{cycles}}{\text{sec.}}\right)\cdot \frac{1}{fp}\left(\frac{\text{sec.}}{\text{cycles}}\right)$$

therefore, $$E=\frac{b(128)\Delta f}{fp}$$

For instance, consider 4800 baud 1:2 pattern $$b=\frac{4800}{2}=2400\ \frac{\text{bits}}{\text{sec.}}$$

consider that the clock supplying the data is 74 c.p.s. high, hence it will ultimately be necessary to move the clock from 1,228,800 c.p.s. to 1,228,874 c.p.s.

Therefore, $\Delta f$=74 c.p.s. initially
$fp$=1,228,800 c.p.s. initially

Within the limits of slide rule accuracy, no difference can be detected between 1,228,800 and 1,228,874. For calculations hence 1,228,800 c.p.s. entirely can be used and the results will be closely borne out by experimental data.

$$E=\frac{2400\ (128)}{1,228,800}\Delta f=\frac{\Delta f}{4}$$

The approach will be to look at the memory and its weighting as shown above. Knowing $\Delta f$ it is possible to determine E. Knowing E, it is possible to determine how long it will take to increase the count in the memory by a fixed number. This will in turn give a new $\Delta f$ and, by continuing the process and later summing the $\Delta f$'s, it is possible to arrive at a total pull-in time.

The results are tabulated in Table 1 and are shown graphically on FIGURE 6.

TABLE 1.—PULL-IN TIME TABULATION

| Calculated Values | | | | | Measured Values | |
|---|---|---|---|---|---|---|
| Total Elapsed Time (sec.) [1] | t (sec.) | Memory Output f (p.p.s.) | Freq. Dif. fd. (c.p.s.) | Excess Add p.p.s. Leaving Regen. | Total Elapsed Time (Sec.) [2] | Memory Output (p.p.s.) |
| 0 | 0 | 0 | 74.00 | 18.6 | 0 | 0 |
| 3.65 | 3.65 | 1.17 | 72.83 | 18.2 | 10 | 6 |
| 7.10 | 3.50 | 2.34 | 71.66 | 17.9 | 20 | 10 |
| 14.30 | 7.20 | 4.68 | 69.32 | 17.4 | 30 | 17 |
| 29.0 | 14.70 | 9.36 | 64.64 | 16.2 | 40 | 21 |
| 36.8 | 7.80 | 14.04 | 59.96 | 15.0 | 50 | 25 |
| 45.3 | 8.55 | 18.72 | 55.28 | 13.8 | 60 | 30 |
| 54.6 | 9.30 | 23.40 | 50.60 | 12.6 | 70 | 33 |
| 64.8 | 10.2 | 28.08 | 45.92 | 11.5 | 90 | 41 |
| 75.9 | 11.1 | 32.76 | 41.24 | 10.3 | 120 | 49 |
| 88.3 | 12.4 | 37.44 | 36.56 | 9.1 | 150 | 55 |
| 102.3 | 14.0 | 42.14 | 31.86 | 7.9 | 180 | 59 |
| 118.5 | 16.2 | 46.82 | 27.18 | 6.8 | 210 | 63 |
| 137.3 | 18.8 | 50.50 | 23.50 | 5.9 | 240 | 66 |
| 159.1 | 21.8 | 55.18 | 18.82 | 4.7 | 270 | 68 |
| 186.3 | 27.2 | 59.86 | 14.14 | 3.52 | 300 | 70 |
| 223.5 | 36.2 | 64.54 | 9.46 | 2.36 | 360 | 71.7 |
| 283.8 | 54.3 | 69.22 | 4.78 | 1.20 | 420 | 72.8 |
| 310.3 | 26.5 | 70.39 | 3.61 | .90 | 480 | 73.3 |
| 345.8 | 35.5 | 71.56 | 2.44 | .61 | 540 | 73.6 |
| 408.3 | 52.5 | 72.73 | 1.27 | .32 | 600 | 73.8 |
| 458.3 | 50.0 | 73.32 | .64 | .16 | 660 | 73.9 |
| 658.3 | 200.00 | 73.91 | .09 | .02 | | |

[1] 10 min. 58.3 sec. calculated. [2] 11 minutes observed.

A second trial run was made without bypassing the averaging counter. Total elapsed time observed was 32 minutes, versus a calculated 32 minutes, 55 seconds.

The first few steps of these calculations follow:

Initially $\Delta f=74$ c.p.s., therefore $E=74/4=18.6$ c.p.s.

To change the 1.2 mc. output frequency and hence reduce $\Delta f$ by 1 c.p.s., the memory must discharge 1 p.p.s. With flip-flop weightings as shown, one can see that if the first 6 flip-flops are in the "1" state, there will issue a total of about 1.17 p.p.s. What is needed, therefore, is: $2^6=64$ ADD pulses from the synchronous regenerator. At a rate of 18.6 p.p.s., this will take 64/18.6=3.65 seconds. Thus, 3.65 seconds later, $\Delta f$ by 1.17 c.p.s. and the new $$\Delta f=74-1.17=72.83 \text{ c.p.s.}$$

This yields a new E of 18.2 p.p.s. If the first seven FF's are enabled, the memory output will be increased by 1.17 p.p.s. to 2.34 p.p.s. This will take $2^7=128$ pulses, of which there already are 64 in the memory. To advance the memory an additional 64 counts requires 64/18.2=3.5 seconds. The new $\Delta f=74-2.34=71.66$ c.p.s. and the new $E=71.66/17.9=7.2$ seconds. 128 additional pulses will advance the memory to the point where the first eight FF's are enabled, increasing the output of the memory to 4.68 p.p.s.

After a total time or 14.3 seconds, the frequency difference has been reduced by 4.68 c.p.s. In a similar manner the remaining entries in Table 1 are computed.

With the averaging counter bypassed, it takes 11 minutes to synchronize over maximum deviation with 4800 baud 1:2 data. The averaging counter, if it is not bypassed, will increase the time to 33 minutes.

Consider the other extreme in pull-in-time, with 75 baud data. In an 8 level code a 1:8 pattern is possible, hence the bit rate is 75/8=9.33 bits per second. Pull-in time is hence $$\frac{2400}{9.33}\frac{(33)}{60}=142$$

hours if the averaging counter is not bypassed. The six days required can be reduced to two by bypassing the averaging counter, hence this is mandatory. Normal traffic is approximately 1:4 pattern, reducing the time to one day. A more reasonable pull-in time would be perhaps ten hours, since two oscillators will normally be within 5 p.p.m. of each other.

In practice, an actual unit will have the components shown schematically in FIGURES 1b–1 to 6b.

*Practical synchronous regenerator (FIGS. 2b–1 and 2b–2)*

FIGS. 2b–1 and 2b–2 contains two main circuits. First, there is a synchronous regenerator, which retimes and reshapes synchronous data, signals with up to 48 percent bias or distortion. This is accomplished by phase correcting a sampling pulse (generated from the clock's internal oscillator) to the incoming data. The correction pulses generated by the synchronous regenerator are evaluated and are used to update the memory, as previously described.

The remainder of the circuitry comprises an idle line time arrangement and margin error accumulator. The latter circuit automatically disables phase corrections within the synchronous regenerator when input data distortion exceeds 25 percent. The idle line timer is required because when there has been an interruption of data and data resumes, it is in random phase with respect to the associated sampling pulse. This means that margin errors can be generated by the synchronous regenerator depending on this phase relationship rather than on the actual data distortion. Without the idle line timer the margin error accumulator would sense the margin errors and, accordingly, would prevent the synchronous regenerator from making phase corrections. This race condition would prevent the synchronous regenerator from synchronizing. By initially inhibiting the margin errors from entering the accumulator, the idle line timer allows the synchronous regenerator to synchronize and the race condition is eliminated.

As previously pointed out synchronous regenerator center-samples each incoming data bit and retains this signal in the output flip-flop until the next sampling pulse occurs. As previously mentioned, the sampling pulse is obtained by dividing an external time base signal by 128 (when properly phase locked). To initially shift the sampling pulse to the proper phase, the time base signal is divided by 127 or 129 instead of 128. If the sampling pulse is occurring too late (after the center of the bit), a "correction pulse" is added to the divider. This causes the next sampling pulse to occur after 127 cycles of the time base instead of 128. This is repeated until the sampling pulse is shifted to the proper phase position. If the sampling pulse is occurring too soon (before the center of the bit), a "subtraction" flip-flop is set. This blocks one cycle of the time base from triggering the divider, and then the substraction flip-flop resets. This causes the next sampling pulse to occur after 129 cycles of the time base instead of 128 cycles. This is repeated until the sampling pulse is shifted to the center of the bit. During normal operation the phase corrections are applied alternately in opposite directions, causing a jitter of $\pm 1/128$ of a bit in the position of the sampling pulse and, therefore, in the output signal. If the frequency of the time base is slightly off (with respect to the input signal) more phase corrections will occur in one direction than the other. Therefore, the average frequency of the sampling pulse is corrected to exactly equal the bit rate of the signal.

The input circuit is a Schmitt trigger arrangement comprised of transistors Q105, Q106, and Q109; polar or neutral signals can be accommodated, and the output at the collector of Q109 is always neutral positive signal. Bias resistors have been factory selected to set the input crossover symmetrically about zero.

The time base input enters gate NG101 and then is divided by 128 in FF101 through 107, to provide the sampling pulse at TP101. The relative phase between the normal or inverted sampling pulses and the data pulses enable NG103 to provide either subtraction or addition pulses, respectively. To SUBTRACT a pulse, FF109 and NG102 provide a pulse at pins 2 and 4 of FF101, blocking one cycle of the incoming time base. To ADD a pulse (roughly .1 microsecond) will appear at pin 1 of FF101 and insert a pulse in its output. FF111 controls the relative timing of the addition and subtraction pulses, insuring that they are inserted and removed at the proper times.

The outputs of FF110 and FF109 provide the ADD and subtract pulses which feed the averaging counter.

If the input data has more than 25 percent distortion or bias, the output of FF108 and data pulses enable gate NG105 to pass pulses seen as margin errors. These pulses are positive spikes which then enter the base of Q110, the input of the margin error accumulator.

Transistor Q110 inverts the signal and capacitor C107 stretches the input pulses to about 50 microseconds. The pulses are used to charge capacitor C108 which in turn brings the negative side of capacitor C110 up towards ground. With a sufficient number of margin errors (approximately 3–10), capacitor C110 is sufficiently discharged to turn Q113 on. This turns Q114 off, placing negative at the base of Q115. Q115 is thus turned off and the emitter of Q116 subsequently goes positive to inhibit gates NG103. Thus, input distortion of more than 25 percent causes the level at TP102 (DISABLE) to rise from ground to about +3 v., blocking phase corrections. This state remains until distortion decreases, at which time capacitor C110 returns negative and the DISABLE point returns to ground.

The normalized data obtained through NG105 and Q101, enters the idle line timer circuit through the base of Q102 as a neutral negative signal. Capacitor C102 is then charged through emitter follower Q103. Capacitor C103 is charged negatively by the train of input pulses and, after a sufficient number of pulses have entered, Q104 is turned on. When transistor Q104 turns on, Q107, turns off and Q108 turns on. The collector of Q107 then becomes high impedance and the ground is hence removed from the input to the margin error accumulator. The "inhibit" caused by the idle line timer lasts in excess of 75 bits. At a correction rate of $1/128$ of a bit per data bit, this at all speeds allows the regenerator to synchronize at least to the point where false margin errors are not generated. This idle line timer is emptied by pressing the rephase button, thus allowing the regenerator to re-synchronize if required.

The emitter of 108 is routed to the averaging counter, and this lead provides a positive level to block corrections until the synchronous regenerator is synchronized. It then returns to ground.

*Practical averaging counter (FIGS. 3b–1 and 3b–2)*

The averaging counter evaluates the ADD and SUBTRACT pulses generated by the synchronous regenerator, and subsequently updates the memory.

The ADD and SUBTRACT pulses enter NG201 which forms a DC flip-flop. These gates set the levels for the counter to move either forward or backward as required. If the memory input switch is set to fast, these up/down lines pass directly to the memory, and the composite train of pulses is derived from pulse-stretcher NG209.

With the memory input switch in normal, the train of pulses hits flip-flops FF201, FF202 and FF203. If the clock happens to be at exactly the same frequency as the distant data clock, equal numbers of ADD and SUBTRACT pulses enter alternately. These pulses are nominally 1 microsecond wide and 2 volts in magnitude. Due to the forward/backward capability of the counter, the net count is zero as long as equal numbers of ADD and SUBTRACT pulses arrive. If one or the other predominates, the counter advances and a pulse is gated out. The state of FF203 dictates whether the pulse gated out is to advance or retard the memory.

Nor-gates NG209 provide the output pulse in fast, and also provide an inhibit to prevent false readout of the counter while in normal. Nor-gates NG207 detect the proper counts for gating out a pulse, and enable NG210 to couple a pulse through. Buffer BA202 stretches the pulse to about 3 microseconds and resets FF201 and FF202. The trailing edge of the output pulse gates a reset pulse for FF203 through gate NG206. Switching between fast and normal is accomplished by enabling or inhibiting gates NG210, NG211, NG212 and NG213. In the switching mode used, −8 v. is used to provide a ground or "0" level, and an open line provides the inhibit or "1" level.

The DISABLE position on the memory input switch blocks all pulses from entering the memory. It inhibits both the fast and normal pulse outputs and at the same time inhibits the forward and backward levels, thereby preventing the memory from changing its count. If faulty operation of the averaging counter is suspected, it may be removed. In this case the reset button should be pressed with the operating mode switch in test. The internal oscillator will then drive all outputs without corrections being supplied.

An idle line control blocks pulses from entering the counter after an interruption in data has occurred. This prevents corrections from changing the memory until the regenerator has synchronized and is again generating reliable ADD and SUBTRACT pulses.

*Practical counter and memory (FIGS. 4b–1 and 4b–2)*

There are two memory registers and counters, 16*a* and 16*b*. They are identical, having been designed for interchangeability. Minor external wiring differences have been accomplished on the main assembly board to keep these boards alike.

The memory counter consists of three main sections: a straight divider chain, a forward/backward counter of six stages, and gating to obtain readout pulses as required from the memory.

The frequency corrections evolving from the averaging counter are applied to flip-flops FF307 through FF312. The forward/backward levels determine whether the counter advances or retards, and the net count in the flip-flops reflects the total number of pulses to be applied to the divider chain.

The upper dividers FF301 through FF306, run continuously, dividing down from the 75 c.p.s. output of the divider chain. The output of each flip-flop is gated with the output of a memory flip-flop below. The state of the memory flip-flop then determines if a pulse is to be gated through or not. Duplicate gating for ADD and SUBTRACT lines allows either to pass pulses as dictated by the main divider chain flip-flop. The ADD and SUBTRACT lines are complementary; their outputs always total 75 pulses per second. The unique gating arrangement provides symmetric distribution of the correction pulses and lack of "bunching" minimizes jitter in the output. Test Point TP302 shows the output frequency of the last divider. If memory register 16b is in position in the clock, its counter input is 75 c.p.s. and TP302 will read 1.172 c.p.s. If memory register 16a is in position, its counter input will hence be 1.172 c.p.s. and its counter output at TP302 will be 1.172 divided by $2^6$, or one cycle every 54.6 seconds.

Buffer BA301 is used for preset or preclear of the memory flip-flops FF307 through FF312, through external strapping on the main assembly card.

*Practical frequency correction and divider circuits (FIG. 5b)*

The ADD and SUBTRACT outputs of both memory units are combined in FIGURE 5b, containing the frequency correction and divider circuitry.

The frequency correction and divider assembly consists of two basic sections, a correction circuit which applies the corrections from the memory to the divider chain, and the divider chain itself.

The 1228.800 kc. polar signal from the oscillator is converted to neutral positive by diode CR708 and is routed through inverters NG701 and NG702 to the input of the first flip-flop in the divider chain, FF705.

Correction pulses enter through the ADD and SUBTRACT lines to NG701. Previous gating in the memory determine the state of FF702 which in turn enables NG701 to pass ADD or SUBTRACT pulses as required. These pulses are about 10 microseconds wide and are visible on the ADD and SUBTRACT test points.

ADD pulses are differentiated and routed to gates NG703 and NG704 comprising a DC flip-flop. These pulses subsequently routed through NG705 to FF705, where narrow pulses are inserted to increase the output frequency of FF705.

SUBTRACT pulses similarly routed to FF703, which subsequently passes a pulse through NG706 to FF705. This temporary positive level blocks one incoming pulse to the flip-flop, hence reducing its output frequency. FF704 controls the proper timing of the ADD and SUBTRACT operations.

Flip-flops FF705 through FF718 comprise the main dividers, which provide time base outputs of 614.4 kc. through 75 c.p.s. Each flip-flop drives a corresponding output driver in the output. In addition, FF705 provides 614.4 kc. through inverter NG706-2 to drive the alarm and switchover circuit.

FF706 through 718 have one input pin routed through buffer amplifier BA701 to FF701, used to clear the divider chain for synchronization.

If a second clock is used for emergency fallback, in order to synchronize the divider chain to the second clock the rephase button is pushed. This causes a pin of FF701 to go to ground, and the output of BA701 to high. This puts a pin of FF706 through FF718 at ground and holds them there. When the 75 c.p.s. input from the other clock goes to ground, FF701 changes state and subsequently all dividers are released simultaneously, in phase with the other clock's dividers. Resistor R704 on pin 2 of FF701 then holds pin 9 high, preventing the 75 c.p.s. signal from triggering the flip-flop until the rephase button is pushed again.

*Output circuits, i.e., drivers (FIG. 6)*

The two output circuits 34a and 34b are identical and interchangeable within the clock. Each unit consists of seven identical output circuits with a common control stage. One of these seven outputs for example, can be described as follows:

The neutral positive output signal from a divider flip-flop enters the base of the first transistor Q601 which inverts, amplifies and converts the signal to 6 volts neutral negative. This signal passes through the second transistor Q602 which is an emitter follower. The last two transistors in the circuit, Q603 and Q604 comprise a switch. If the output of this switch is fed to the output of a similar switch in a fallback clock, only one at a time actually passes the output signal. The switch arrangement keeps the unwanted signal from feeding out onto the line.

The state of the output control transistor Q604 is normally determined by the switchover circuit. It insures that the control transistors in the active and standby units are in the proper state, and that they change state accordingly if one clock fails.

Each output circuit provides a neutral negative 6 volt signal capable of driving up to 16 nominal 1 ma. circuits.

It is to be observed therefore that the present invention provides for a digital frequency corrected clock. It is theoretically capable of tracking a distant source to any desired degree of accuracy. Furthermore, as shown in FIGURE 1b, automatic disabling of the memory input is provided during periods of doubtful transmission quality, as sometimes occurs on radio paths, by a distortion alarm circuit. Automatic disabling of the memory input is provided, after interruption of signal on the reference channel, by means of an idle line timer arrangement. This prevents the clock from wrongly interpreting the initial phase corrections after idle line as a frequency error.

The clock lends itself ideally to integrated circuits and will operate in practically any desired environment. The unit actually built, operated at 60° C., with no degradation of performance. The unit as built occupied a space of 5¼ inches high, 8 inches wide and 20 inches deep, including the crystal oscillator. The unit could even be made smaller. Since the average frequency counter is not equipped to measure parts in $10^8$, a special measuring technique is necessary in order to properly evaluate performance of the clock. Measurement increments of 3 parts in $10^8$, is possible by using a six-digit counter. Using an external flip-flop, it is possible to measure increments of 1.5 pp. $10^8$, with two flip-flops .75 pp. $10^8$, etc. The unit built demonstrated tracking to within three parts in $10^8$.

While the present invention has been described in a preferred embodiment, it will be obvious to those skilled in the art that various modifications can be made therein within the scope of the invention, and it is intended that the appended claims cover all such modifications.

What is claimed is:

1. A frequency reference system, comprising in combination,
   (a) an oscillator to supply a local internal frequency;
   (b) a synchronous regenerator, including an input side for receiving frequency data, and phase locking to said data, pulse-giving means to supply error pulses corresponding to the phase difference between said internally supplied local frequency and said received frequency data on its output side;
   (c) a counter and memory responsive to said output side to count and retain said pulses;
   (d) a main divider chain, responsive to said oscillator to provide other frequency signals based upon said oscillator frequency;
   (e) correction gating circuitry between said main divider chain and said counter and memory to correct the frequencies supplied by said main divider chain in accordance with the information contained in and supplied to said counter and memory; and,
   (f) output circuitry from said main divider chain for utilization means.

2. A system as claimed in claim 1, including an averaging counter responsive to said synchronous regenerator and supplying to said counter and memory only the average error pulses produced by said synchronous regenerator so as to eliminate pulses created by noise.

3. A system as claimed in claim 2, said counter and memory including flip-flops acting as pulse memories and gating circuitry to enable the flip-flops.

4. A system as claimed in claim 3, including circuit means in the gating arrangement to ensure that correction pulses are evenly distributed in time without bunching.

5. A system as claimed in claim 4, said main divider chain including at least one flip-flop for each divider and gating circuitry therefore.

6. A system as claimed in claim 5, including an alarm circuit having disabling means coupled to the memory input for disabling the memory during periods of doubtful transmission causing distortion.

7. A system as claimed in claim 6, including an idle line timer arrangement in said synchronous regenerator to prevent the system from wrongly interpreting the initial phase correction after idle line as a frequency error.

8. In a frequency reference system including an oscillator to supply a local internal frequency and digital frequency correction means for correcting said supplied local internal frequency according to external input data supplied to said digital frequency correction means, the improvement in said digital frequency correction means comprising therein disabling means responsive to distortion occurring during periods of a plurality of said input data for disabling the input to the digital frequency correction means during said periods.

9. In a frequency reference system as claimed in claim 8, including an idle line timer in said digital frequency correction means to prevent the system from wrongly interpreting initial phase correction after idle line as a frequency error.

References Cited

UNITED STATES PATENTS

| | | | |
|---|---|---|---|
| 3,142,802 | 7/1964 | Maure | 328—63 X |
| 3,218,560 | 11/1965 | Peters | 307—88.5 |

ROY LAKE, *Primary Examiner.*

S. H. GRIMM, *Assistant Examiner.*